US010917352B1

(12) United States Patent
Hanes et al.

(10) Patent No.: US 10,917,352 B1
(45) Date of Patent: Feb. 9, 2021

(54) SELECTIVE TRACKING OF ACKNOWLEDGMENTS TO IMPROVE NETWORK DEVICE BUFFER UTILIZATION AND TRAFFIC SHAPING

(71) Applicant: Cisco Technology, Inc., San Jose, CA (US)

(72) Inventors: M. David Hanes, Lewisville, NC (US); Santosh Ramrao Patil, Santa Clara, CA (US); Gonzalo Salgueiro, Raleigh, NC (US); Akramsheriff Ismailsheriff, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/560,386

(22) Filed: Sep. 4, 2019

(51) Int. Cl.
| | |
|---|---|
| *H04L 12/26* | (2006.01) |
| *H04L 12/803* | (2013.01) |
| *H04L 12/801* | (2013.01) |
| *H04L 12/807* | (2013.01) |
| *H04L 12/813* | (2013.01) |
| *H04L 29/06* | (2006.01) |
| *H04L 12/841* | (2013.01) |

(52) U.S. Cl.
CPC ............ *H04L 47/125* (2013.01); *H04L 47/11* (2013.01); *H04L 47/20* (2013.01); *H04L 47/27* (2013.01); *H04L 47/283* (2013.01); *H04L 69/16* (2013.01)

(58) Field of Classification Search
CPC ....... H04L 47/125; H04L 47/11; H04L 47/20; H04L 47/27; H04L 47/283; H04L 69/16
USPC .............. 370/229–235, 236–236.2, 248–253
See application file for complete search history.

(56) References Cited

U.S. PATENT DOCUMENTS

| 4,453,229 A * | 6/1984 | Schaire ................. G06F 13/124 |
| | | 710/109 |
| 8,620,263 B2 * | 12/2013 | Ravishankar ......... H04M 15/85 |
| | | 455/406 |

(Continued)

FOREIGN PATENT DOCUMENTS

| EP | 1829321 A2 | 9/2007 |
| WO | 03025709 A2 | 3/2003 |

OTHER PUBLICATIONS

Mittal, Radhika, "Towards a More Stable Network Infrastructure," https://escholarship.org/uc/item/33n1g8hz, Aug. 7, 2018.

(Continued)

*Primary Examiner* — Thai D Hoang
(74) *Attorney, Agent, or Firm* — Polsinelli PC

(57) ABSTRACT

Systems and methods provide for Selective Tracking of Acknowledgments (STACKing) to improve buffer utilization and traffic shaping for one or more network devices. A network device can identify a first flow that corresponds to a predetermined traffic class and a predetermined congestion state. The device can determine a current window size and congestion threshold of the first flow. In response to a determination to selectively track a portion of acknowledgments of the first flow, the device can track, in main memory, information of a first portion of acknowledgments of the first flow. The device can exclude, from one or more buffers, a second portion of acknowledgments of the first flow. The device can re-generate and transmit segments corresponding to the second portion of acknowledgments at a target transmission rate based on traffic shaping policies for the predetermined traffic class and congestion state.

20 Claims, 7 Drawing Sheets

(56) References Cited

U.S. PATENT DOCUMENTS

| | | | |
|---|---|---|---|
| 9,444,749 B2* | 9/2016 | Cociglio | H04L 47/323 |
| 9,552,550 B2 | 1/2017 | Vasseur et al. | |
| 10,187,413 B2 | 1/2019 | Vasseur et al. | |
| 2006/0203730 A1* | 9/2006 | Zur | H04L 47/263 |
| | | | 370/235 |
| 2008/0049638 A1 | 2/2008 | Ray et al. | |
| 2008/0049706 A1* | 2/2008 | Khandekar | H04J 13/00 |
| | | | 370/342 |
| 2013/0070600 A1* | 3/2013 | Nakajima | H04L 47/762 |
| | | | 370/235 |
| 2016/0241484 A1* | 8/2016 | De Schepper | H04L 47/31 |
| 2018/0212885 A1 | 7/2018 | Contavelli et al. | |
| 2019/0171604 A1* | 6/2019 | Brewer | G06F 13/1684 |
| 2019/0190830 A1 | 6/2019 | Litzinger | |
| 2019/0223252 A1* | 7/2019 | Zhou | H04W 80/02 |

OTHER PUBLICATIONS

International Search Report and Written Opinion from the International Searching Authority, dated Oct. 30, 2020, 12 pages, for corresponding International Patent Application No. PCT/US2020/047656.

\* cited by examiner

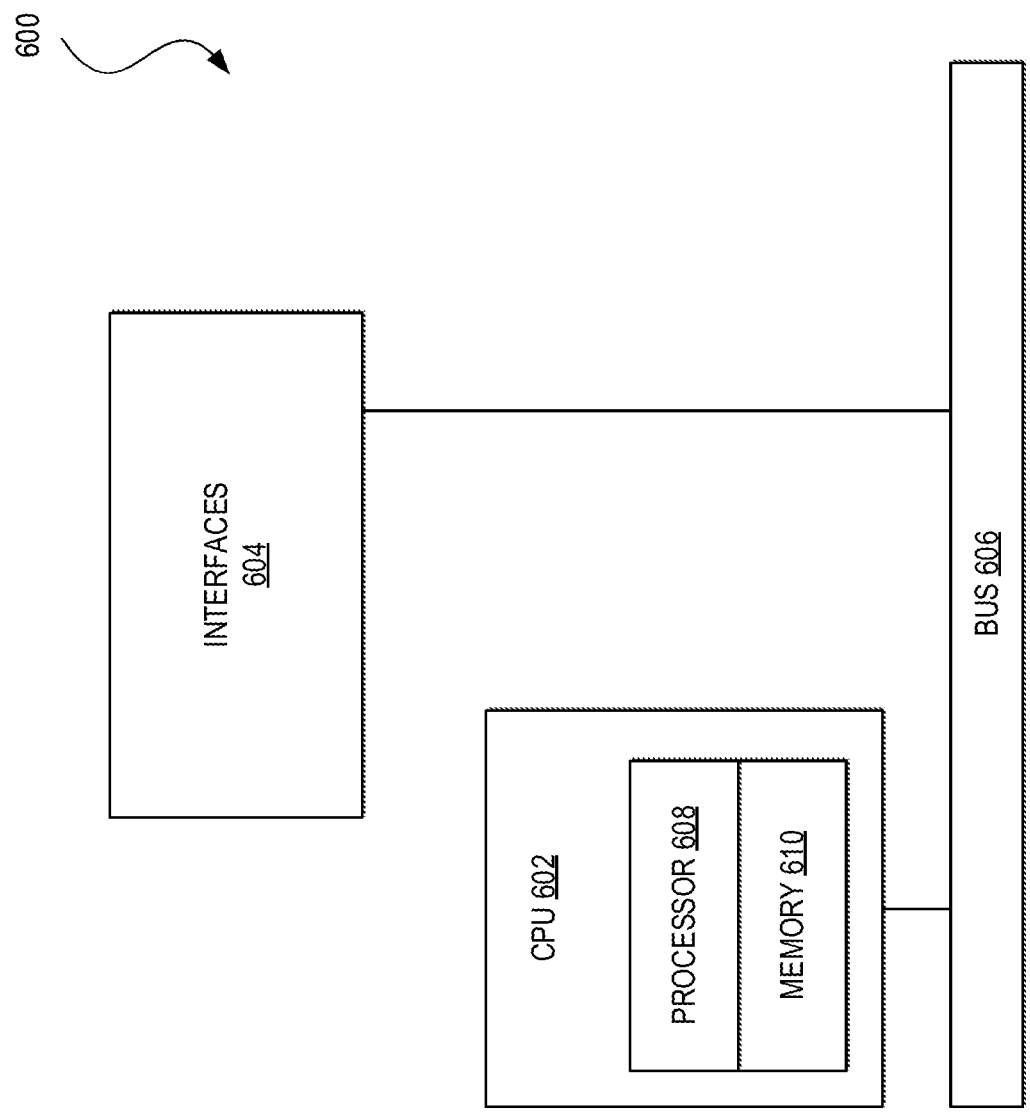

SELECTIVE TRACKING OF ACKNOWLEDGMENTS TO IMPROVE NETWORK DEVICE BUFFER UTILIZATION AND TRAFFIC SHAPING

TECHNICAL FIELD

The subject matter of this disclosure relates in general to the field of computer networking, and more particularly, to systems and methods for selective tracking of acknowledgments to improve network device buffer utilization and traffic shaping capabilities.

BACKGROUND

An access network can provide connectivity to computing devices (e.g., servers, workstations, desktop computers, laptop computers, tablets, mobile phones, etc.) and things (e.g., desk phones, security cameras, lighting, windows, doors, locks, medical devices, industrial and manufacturing equipment, etc.) within environments such as offices, hospitals, colleges and universities, oil and gas facilities, factories, and similar locations. Some of the unique challenges an access network may face include integrating wired and wireless devices, on-boarding computing devices and things that can appear anywhere in the network and maintaining connectivity when the devices and things migrate from location to location within the network, supporting Bring Your Own Device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; Authentication, Authorization, and Accounting (AAA) services, Wireless Local Area Network (WLAN) controllers; Command Line Interfaces (CLIs) for each switch, router, or other network device; etc.) and manually stitching these systems together. This can make network deployment difficult and time-consuming, and impede the ability of many organizations to innovate rapidly and to adopt new technologies, such as video, collaboration, and connected workspaces.

Another challenge faced by access networks is the greater amount of traffic they carry and the greater diversity of traffic flowing across their infrastructure than ever before. Being able to properly understand these traffic flows, optimize them, and plan for future network and application growth and change are imperative for any organization. The foundation for such an understanding is greater visibility into what types of traffic and applications are flowing within the network, and how these applications are performing relative to business-critical objectives of the organization. Many organizations today lack the understanding they need for the flow and operation of various traffic types within their networks. Compounding these difficulties can be the relative inflexibility of the network devices that handle much of the heavy lifting of connecting users, devices, and things to the network. Network devices must be able to accommodate a wide range of network topologies, types of traffic, connectivity options, applications, users, devices, and things but are constrained by the hardware resources (e.g., processing, memory, storage, etc.) available to them.

BRIEF DESCRIPTION OF THE FIGURES

To provide a more complete understanding of the present disclosure and features and advantages thereof, reference is made to the following description, taken in conjunction with the accompanying drawings, in which:

FIG. 6 illustrates a block diagram of an example of a network device in accordance with an embodiment.

DESCRIPTION OF EXAMPLE EMBODIMENTS

Figure 1:
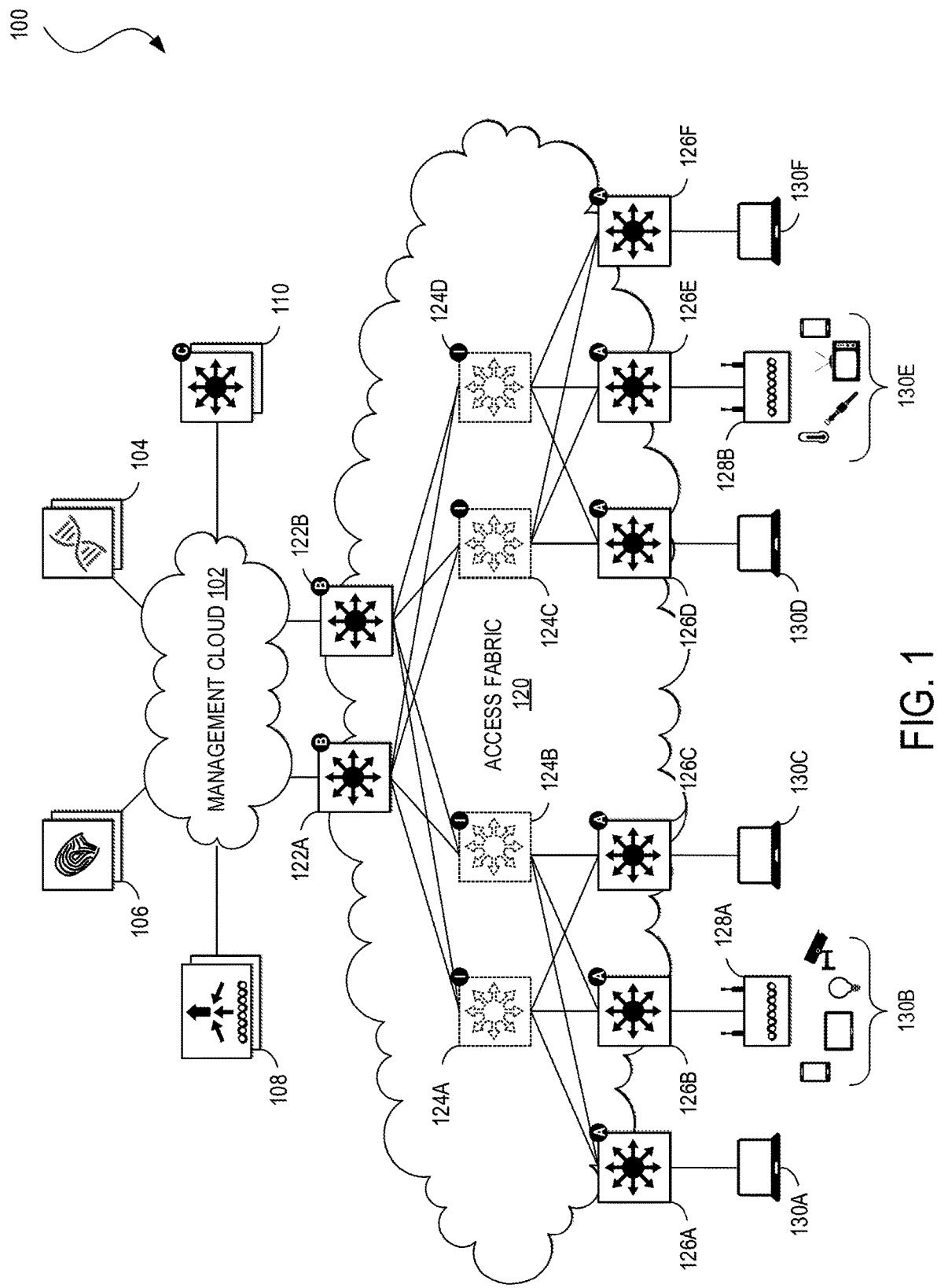
FIG. 1 illustrates an example of an access network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for Selective Tracking of Acknowledgments (STACKing) to improve buffer utilization and traffic shaping for one or more network devices. In some embodiments, a network device can identify, within current traffic data of a network, a first flow that corresponds to a predetermined traffic class and a predetermined congestion state. The network device can determine at least one of a current window size or a current congestion threshold of the first flow. In response to a determination to selectively track a portion of acknowledgments of the first flow based on at least one of the current window size or the current congestion threshold, the network device can track, in main memory, information of a first portion of acknowledgments of the first flow. The network device can exclude, from one or more buffers of the network device, a second portion of acknowledgments of the first flow. The network device can re-generate segments corresponding to the second portion of acknowledgments based on the information in the main memory of the network device. The network device can transmit re-generated segments corresponding to the second portion of acknowledgements at a target transmission rate based on one or more traffic shaping policies for the predetermined traffic class and the predetermined congestion state.

EXAMPLE EMBODIMENTS

Traffic shaping is a mechanism for managing network traffic congestion that can involve the creation of queues, assignment of traffic to those queues based on a classification of the traffic, and scheduling of the traffic in a queue for transmission. The effectiveness of traffic shaping can depend on the hardware of a network device (e.g., switch, router, etc.), such as its Central Processing Unit (CPU) or Network Processing Unit (UNIT) (e.g., chip), memory (e.g., on-chip memory), interface buffers (e.g., off-chip memory), and so forth. For example, traffic shaping can deny bandwidth to lower priority traffic in favor of higher priority traffic and may result in dropped traffic when the network device has insufficient buffer space to accommodate all traffic. Conventional traffic shaping can slow down traffic by adjusting the transmission rate of acknowledgments (e.g., Transport Control Protocol (TCP) Acknowledgments (ACKs)) to adjust the transmission rate of traffic using congestion control. To adjust the transmission rate of acknowledgments, conventional traffic shaping can buffer all acknowledgments and schedule their transmission according to a rate specified by the network's traffic shaping policies. This can require storage of a significant number of acknowledgments and a large buffer space, which can be a relatively scarce resource for network devices. Traffic shaping can also introduce additional processing overhead, such as to monitor, classify, and schedule traffic. This can induce unacceptable levels of latency depending on the network device's CPU and memory and traffic loads. Conventional traffic shaping often utilizes a static configuration, and a network device's hardware establishes the upper bounds of its capacity. A network device may encounter diverse types of traffic, and can reach obsolescence much more rapidly than expected if it is incapable of adapting to changing network conditions. Various embodiments of the present disclosure can overcome these and other deficiencies of the art by Selective Tracking of Acknowledgments (STACKing, e.g., as in stacking ACKs in a network device's main memory or on-chip memory instead of the device's interface buffers or off-chip memory) to improve buffer utilization and traffic shaping of network devices, and applying machine learning techniques to optimize when to perform STACKing.

FIG. 1 illustrates a block diagram of an example of an access network 100. It should be understood that, for the access network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the access network 100 can include any number or type of resources, which can be accessed and utilized by endpoints or network devices. The illustrations and examples provided herein are for clarity and simplicity.

An access network can refer to a Local Area Network (LAN), a Layer 2 or virtual Layer 2 network, an enterprise network, or other network in which nodes (e.g., endpoints, network devices, etc.) can connect directly (e.g., single hop) or indirectly (e.g., multiple hops) to one another without a Wide Area Network (WAN) transport network. For example, an access network can include a data center network, a campus network, a branch network, and the like. In this example, the access network 100 includes a management cloud 102 and an access fabric 120. Although shown as an external network or cloud external to the access fabric 120 in this example, the management cloud 102 may alternatively or additionally reside on the premises of an organization or in a colocation center (in addition to being hosted by a cloud provider or similar environment). The management cloud 102 can provide a central management plane for building and operating the access fabric 120. The management cloud 102 can be responsible for forwarding configuration and policy distribution, as well as device management and analytics. The management cloud 102 can comprise one or more access fabric controller appliances 104, one or more Authentication, Authorization, and Accounting (AAA) appliances 106, one or more Wireless Local Area Network (LAN) Controllers (WLCs) 108, and one or more access fabric control plane devices 110 (e.g., referred to as fabric control plane nodes in Cisco® Software-Defined Access (SD-Access) and Cisco® Digital Network Architecture (Cisco DNA™)). In other embodiments, one or more components of the management cloud 102 may be co-located with the access fabric 120.

The access fabric controller appliances 104 can function as the command and control system for one or more access fabrics 120, and can house automated workflows for deploying and managing the access fabrics. The access fabric controller appliances 104 can provide automation, design, policy, provisioning, and assurance functions, among others, as discussed further below with respect to FIG. 2. In some embodiments, the Cisco® SD-Access controller can operate as the access fabric controller appliances 104, and can reside in one or more Cisco Digital Network Architecture (Cisco DNA™) appliances.

The AAA appliances 106 can control access to computing resources, facilitate enforcement of network policies, audit usage, and provide information necessary to bill for services. The AAA appliances 106 can interact with the access fabric controller appliances 104, other network controllers (e.g., a data center network controller, a WAN controller, etc.), and other databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The WLCs 108 can support wireless access points (e.g., wireless access points 128A and 128B (collectively, 128)) attached to the access fabric 120, handling traditional tasks associated with a WLC as well as interactions with the access fabric control plane devices 110 for wireless endpoint registration and roaming. In some embodiments, the access fabric 120 can implement a wireless deployment that moves data-plane termination (e.g., VXLAN) from a centralized location (e.g., with previous overlay Control and Provisioning of Wireless Access Points (CAPWAP) deployments) to one or more wireless access points/access layer devices. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLCs 108.

The access fabric 120 can comprise access fabric border devices 122A and 122B (referred to as fabric border nodes in Cisco SD-Access) (collectively, 122), access fabric intermediate devices 124A-D (referred to as fabric intermediate nodes in Cisco® SD-Access) (collectively, 124), and access fabric access layer devices 126A-F (referred to as fabric edge nodes in Cisco® SD-Access) (collectively, 126). Although the access fabric control plane devices 110 are shown to be external to the access fabric 120 in this example, in other embodiments, the access fabric control plane devices 110 may be co-located with the access fabric 120. In embodiments where the access fabric control plane devices 110 are co-located with the access fabric 120, the access fabric control plane devices 110 may comprise a dedicated network device or set of network devices, or the functionality of the access fabric control plane devices 110 may be implemented by the access fabric border devices 122.

The access fabric control plane devices 110 can serve as a central database for tracking all users, devices, and things as they attach to the access fabric 120, and as they roam around. The access fabric control plane devices 110 can allow network infrastructure (e.g., switches, routers, WLCs, etc.) to query the database to determine the locations of users, devices, and things attached to the access fabric 120 instead of using a flood and learn mechanism. In this manner, the access fabric control plane devices 110 can operate as a single source of truth about where every endpoint attached to the access fabric 120 is located at any point in time. In addition to tracking specific endpoints (e.g., /32 address for Internet Protocol version v4 (IPv4), /128 address for Internet Protocol version 6 (IPv6), etc.), the access fabric control plane devices 110 can also track summary prefixes (e.g., Internet Protocol (IP)/mask). This flexibility can help in summarization across access fabric sites and improve overall scalability.

The access fabric border devices 122 can connect the access fabric 120 to traditional Layer 3 networks (e.g., non-fabric networks) or to different access fabric sites. The access fabric border devices 122 can also translate context (e.g., user, device, or thing mapping and identity) from one access fabric site to another access fabric site or to a traditional Layer 3 network. When the encapsulation is the same across different access fabric sites, the translation of access fabric context can generally be mapped one to one. The access fabric border devices 122 can also exchange reachability and policy information with access fabric control plane devices of different access fabric sites. The access fabric border devices 122 can also provide border functions for internal networks and external networks. Internal borders can advertise a defined set of known subnets, such as those leading to a group of branch sites or to a data center. External borders, on the other hand, can advertise unknown destinations (e.g., to the Internet and similar in operation to the function of a default route).

The access fabric intermediate devices 124 can operate as Layer 3 forwarders that connect the access fabric border devices 122 to the access fabric access layer devices 126, and can provide the Layer 3 underlay for fabric overlay traffic. The access fabric access layer devices 126 can connect endpoints to the access fabric 120 and can encapsulate/de-encapsulate and forward traffic from these endpoints to and from the network fabric. The access fabric access layer devices 126 can operate at the perimeter of the access fabric 120, and may be the first points for attachment of users, devices, and things and the implementation of policy. In some embodiments, the access fabric 120 can also include access fabric extended devices (referred to as fabric extended nodes in Cisco® SD-Access) (not shown) for attaching downstream non-fabric Layer 2 network devices to the access fabric 120 and thereby extend the access fabric 120. For example, access fabric extended devices can be small switches (e.g., compact switch, industrial Ethernet switch, building automation switch, etc.) which connect to the access fabric access layer devices 126 via Layer 2. Endpoints and network devices connected to the access fabric extended devices can use the access fabric access layer devices 126 for communication to outside subnets.

In this example, the network fabric 120 can represent a single access fabric site deployment which can be differentiated from a multi-site access fabric deployment as discussed further below with respect to FIG. 3 and elsewhere in the present disclosure. In some embodiments, all subnets hosted in an access fabric site can be provisioned across every access fabric access device 126 in that access fabric site. For example, if the subnet 10.10.10.0/24 is provisioned in a given access fabric site, this subnet may be defined across all of the access fabric access layer devices 126 in that fabric site, and endpoints located in that subnet can be placed on any access fabric access device 126 in that fabric site. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRv's), Cisco Integrated Services Virtual Routers (ISRv's), Cisco Meraki® MX appliances, and/or other Cisco DNA-Ready™ devices can operate as the access fabric devices 110, 122, 124, and 126.

The access network 100 can also include wired endpoints 130A, 130C, 130D, and 130F and wireless endpoints 130B and 130E (collectively, 130). The wired endpoints 130A, 130C, 130D, and 130F can connect by wire to access fabric access layer devices 126A, 126C, 126D, and 126F, respectively, and the wireless endpoints 130B and 130E can connect wirelessly to wireless access points 128A and 128B, respectively, which in turn can connect by wire to access fabric access layer devices 126B and 126E, respectively. In some embodiments, Cisco Aironet® access points, Cisco Meraki® MR access points, and/or other Cisco DNA™-ready access points can operate as the wireless access points 128.

The endpoints 130 (sometimes also referred to as hosts, clients, servers, devices, things, etc.) can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating, Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, Point of Sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the access fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLCs 108 notifying the access fabric control plane devices 110 of joins, roams, and disconnects by the wireless endpoints 130 such that the access fabric control plane devices 110 can have connectivity information about both wired and wireless endpoints in the access fabric 120, and can serve as the single source of truth for endpoints connected to the access fabric 120. For data plane integration, the WLCs 108 can instruct the wireless access points 128 to form a VXLAN overlay tunnel to their adjacent access fabric access layer devices 126. The VXLAN tunnel can carry segmentation and policy information to and from the access fabric access layer devices 126, allowing connectivity and functionality identical or similar to that of a wired endpoint. When the wireless endpoints 130 join the access fabric 120 via the wireless access points 128, the WLCs 108 can onboard the endpoints into the access fabric 120 and inform the access fabric control plane devices 110 of the endpoints' Media Access Control (MAC) addresses. The WLCs 108 can then instruct the wireless access points 128 to form VXLAN overlay tunnels to the adjacent access fabric access layer devices 126. Next, the wireless endpoints 130 can obtain IP addresses for themselves via Dynamic Host Configuration Protocol (DHCP). Once that completes, the access fabric access layer devices 126 can register the IP addresses of the wireless endpoint 130 to the access fabric control plane devices 110 to form a mapping between the endpoints' MAC and IP addresses, and traffic to and from the wireless endpoints 130 can begin to flow.

Figure 2:
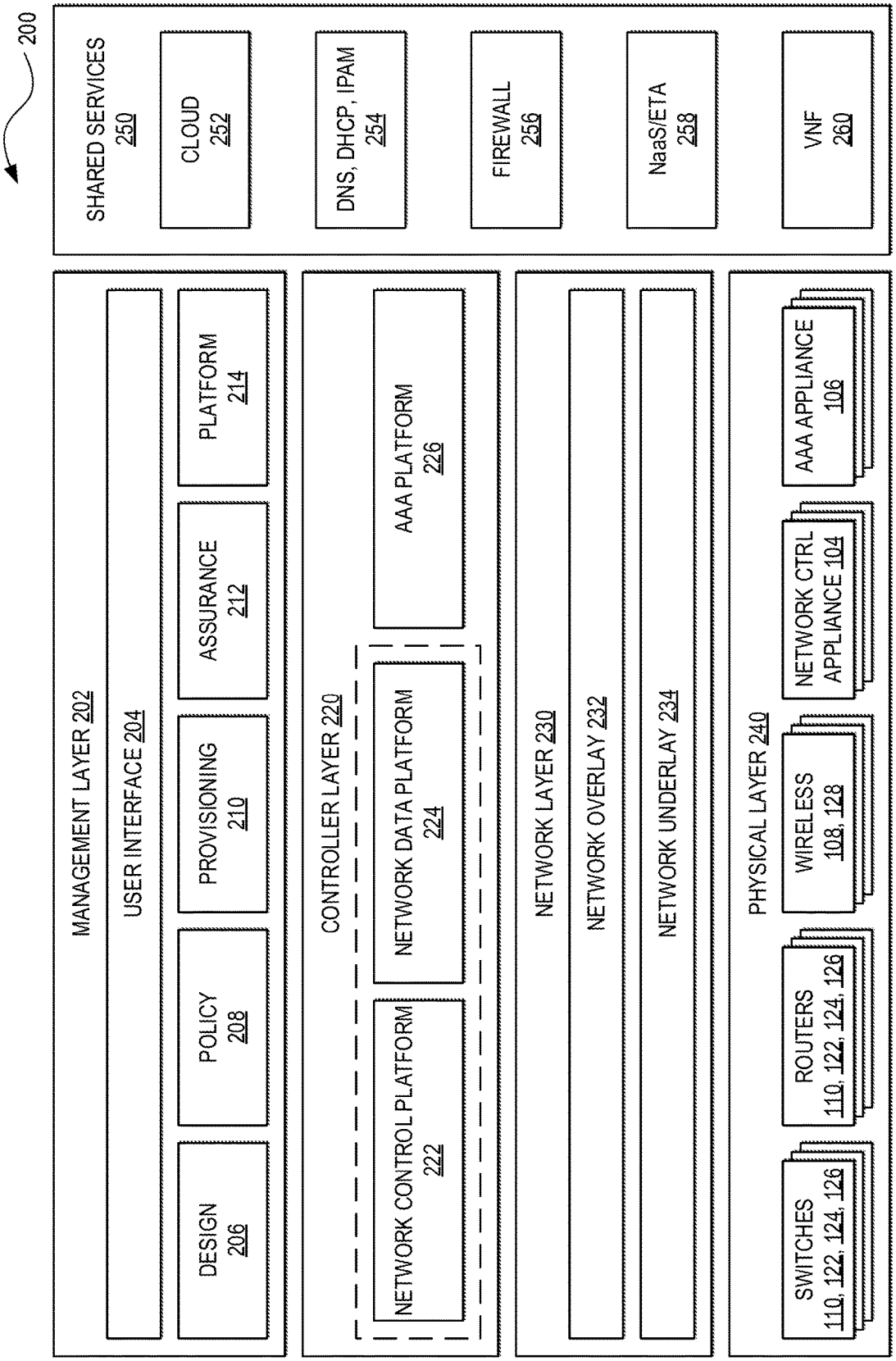
FIG. 2 illustrates an example of a network management system for the access network of FIG. 1 in accordance with an embodiment.

FIG. 2 illustrates an example of a network management system 200 for the access network 100. One of ordinary skill in the art will understand that, for the network management system 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the network management system 200 includes a management layer 202, a controller layer 220, a network layer 230, a physical layer 240, and shared services 250. An example of an implementation of the network management system 200 is the Cisco® SD-Access or Cisco DNA™ platform.

The management layer 202 can abstract the complexities and dependencies of other layers and provide a user with tools and workflows to manage the access network 100). The management layer 202 can include a user interface 204 for an administrator to execute design functions 206, policy functions 208, provisioning functions 210, assurance functions 212, and platform functions 214 of the network management system 200. An example of an implementation of the user interface 204 is Cisco DNA™ Center. The user interface 204 can provide the administrator a single point to manage and automate the access network 100. The user interface 204 can be implemented within one or more web applications/web servers accessible by a web browser and/or one or more applications/application servers accessible by a desktop application, a mobile app, a shell program or other Command Line Interface (CLI), an Application Programming Interface (e.g., Network Configuration (NETCONF) Protocol, Restful State Transfer (REST), Simple Object Access Protocol (SOAP), Service Oriented Architecture (SOA), etc.), a Software Development Kit (SDK) for a programming language such as C++, GO, JAVA, JAVASCRIPT, NODE.JS, PHP, PYTHON, RUBY, and so forth, and/or other suitable interface in which the administrator can configure network infrastructure locally or via the cloud; provide user preferences; specify policies, enter data; review statistics; configure interactions or operations; and so forth. The user interface 204 may also provide visibility information, such as views of the nodes of the access network 100 (e.g., the endpoints 130, the network devices 104, 108, 110, 122, 124, or 128, the AAA appliance 106, etc.). For example, the user interface 204 can provide a view of the status or conditions of the access network 100, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the access network 100. The assurance functions 212 can use machine learning and analytics to provide end-to-end visibility of the access network 100 by learning from the endpoints, network devices, appliances, and other contextual sources of information. The platform functions 214 can include tools and workflows for integrating the access network 100 with other technologies.

In some embodiments, the design functions 206, the policy functions 208, the provisioning functions 210, the assurance functions 212, and the platform functions 214 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the lifecycle of the access network 100.

The controller layer 220 can comprise subsystems for the management layer 202 and may include a network control platform 222, a network data platform 224, and an AAA platform 226. These controller subsystems can form an abstraction layer to hide the complexities and dependencies of managing many network elements and protocols. The network control platform 222 can provide automation and orchestration services for the network layer 230 and the physical layer 240, and can include the settings, protocols, and tables to automate management of the network and physical layers. In addition, the network control platform 222 can include tools and workflows for discovering switches, routers, wireless controllers, and other network devices; maintaining network and endpoint details, configurations, and software versions; Plug-and-Play (PnP) for automating deployment of network infrastructure, Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network nodes (e.g., endpoints, network devices, etc.) using Network Configuration (NETCONF)/Yet Another Next Generation (YANG), a Restful State Transfer (REST) Application Programming Interface (API), Simple Network Management Protocol (SNMP), Secure Shell (SSH)/Telnet or other Command Line Interface (CLI), and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the access network 100. The network data platform 224 can collect multiple types of information from network devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA platform 226 can provide identity and policy services for the network layer 230 and physical layer 240, and may include the settings, protocols, and tables to support endpoint identification and policy enforcement services. The AAA platform 226 can provide tools and workflows to manage virtual networks and security groups, and to create group-based policies and contracts. The AAA platform 226 can identify and profile network devices and endpoints using AAA/RADIUS, 802.1X, MAC Authentication Bypass (MAB), web authentication, and EasyConnect, among others. The AAA platform 226 can also collect and use contextual information from the network control platform 222, the network data platform 224, and the shared services 250, among others. In some embodiments, Cisco® ISE can operate as the AAA platform 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay 234 may use any topology and routing protocol.

In some embodiments, the network management system 200 can provide a LAN automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane can translate user intent into network policy. That is, the fabric policy plane is where the network operator can instantiate logical network policy based on services offered by the network layer 230, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the Virtual Network Identifier (VNID) and Scalable Group Tag (SGT) fields in packet headers. The access network 100 can support both macro-segmentation and micro-segmentation. Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the access network 100 defined by a Layer 3 routing domain and can provide both Layer 2 and Layer 3 services (using the VXLAN VNID to provide both Layer 2 and Layer 3 segmentation). Micro-segmentation logically can separate user or device groups within a VN, by enforcing source to destination access control permissions, such as by using Access Control Lists (ACLs). A scalable group is a logical object identifier assigned to a group of users, devices, or things in the access network 100. It can be used as source and destination classifiers in Scalable Group ACLs (SGACLs). The SGT can be used to provide address-agnostic group-based policies.

In some embodiments, the access fabric control plane device 110 may implement the LISP to communicate with one another and with the management cloud 102. Thus, the control plane nodes may operate a host tracking database, a map server, and a map resolver. The host tracking database can track the endpoints 130 connected to the access fabric 120 and associate the endpoints to the access fabric access layer devices 126, thereby decoupling an endpoint's identifier (e.g., IP or MAC address) from its location (e.g., closest router) in the access network 100.

The physical layer 240 can comprise physical network devices, such as wired switches and routers 110, 122, 124, and 126 and wireless network devices 108 and 128, and network appliances, such as the access fabric controller appliances 104, the AAA appliances 106, and physical network appliances (if any) of the shared services 250.

The shared services 250 can provide an interface to various network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services 250 using APIs.

Figure 3:
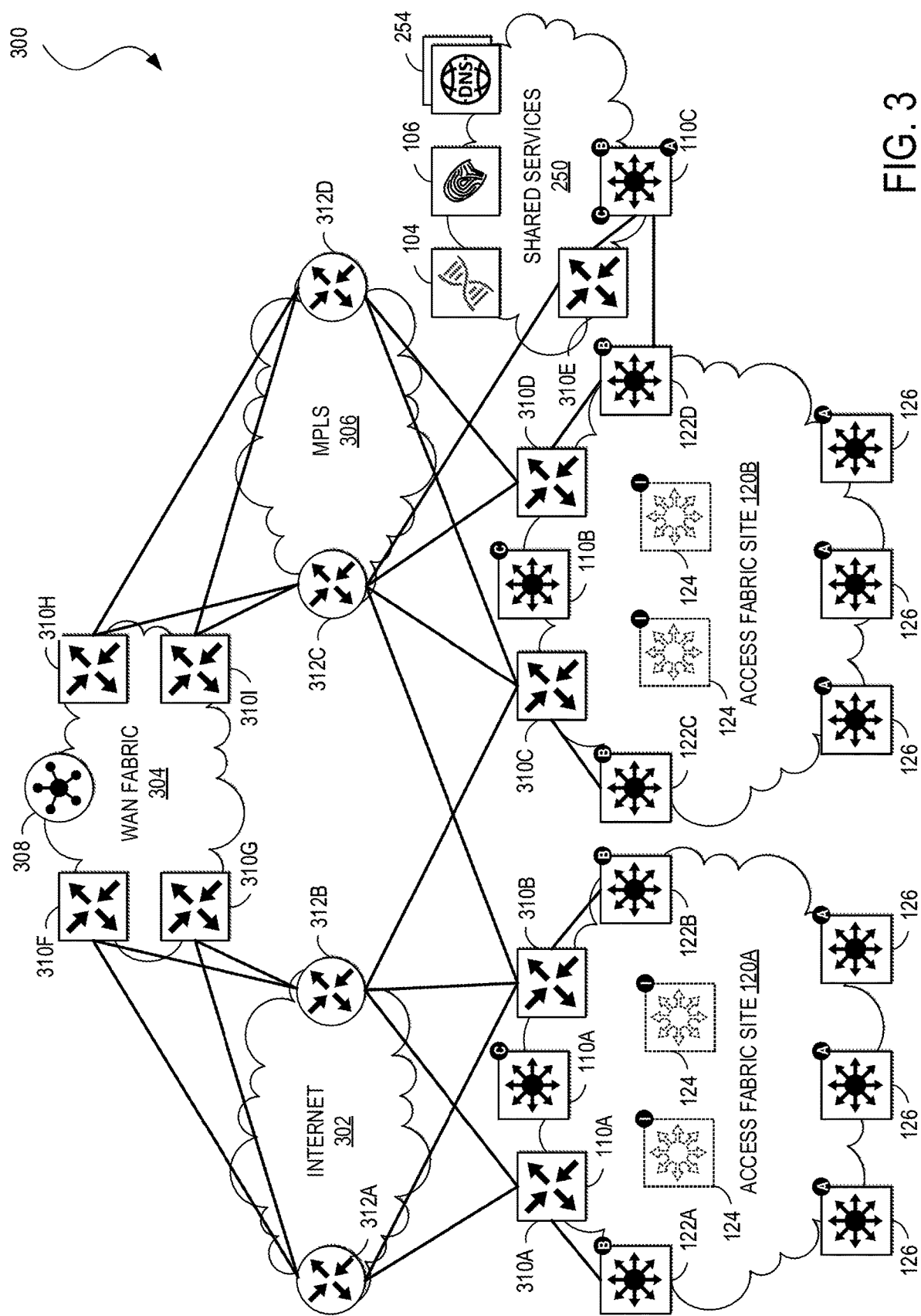
FIG. 3 illustrates an example of a multi-site access network in accordance with an embodiment.

FIG. 3 illustrates an example of network environment 300 of a multi-site access fabric. The multi-site access fabric can include access fabrics 120A and 120B and the shared services 250 (collectively, 120). In this example, the access fabric 120A can connect to the access fabric 120B and the shared services 250 via WAN fabric 304, and the access fabric 120B and the shared services 250 can directly connect to one another via the access fabric border device 122D and the access fabric control plane device 110C. In other embodiments, the access fabric 120A may connect directly to the access fabric 120B and/or the shared services 250, the access fabric 120B may additionally or alternatively connect to the shared services 250 via the WAN fabric 304, and the access fabrics 120 may alternatively or additionally connect to one another via other transport networks. Each access fabric 120 can include or more access fabric control plane devices 110, access fabric border devices 122, access fabric intermediate devices 124, and access fabric access layer devices 126. In this example, the access fabric control plane device 122C can also operate as the access fabric border device 122 and the access fabric access device 126 for the shared services 250 within a single physical network device. In another embodiment, the access fabric border device 122D and the access fabric control plane device 110C can be a single physical network device.

The access fabric 120 can form a single fabric under common administrative control of an access fabric network controller, such as the access fabric controller appliance 104, but can be interconnected by one or more transport networks, such as one or more Internet Service Provider (ISP) networks, like Internet transport network 302 (e.g., Digital Subscriber Line (DSL), cable, etc.); a Multi-Protocol Label Switching (MPLS) service provider network or other private packet-switched network technology (e.g., Metro Ethernet, Frame Relay, Asynchronous Transfer Mode (ATM), etc.), like MPLS network 306; a mobile service provider network (e.g., Long-Term Evolution (LTE), 4th Generation (4G), 5th Generation (5G), 6th Generation (6G), etc.); or other WAN technology or WAN service provider network (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN); or other private circuit-switched network; small aperture terminal (VSAT) or other satellite network; etc.).

The access fabric sites 120 can also be independent networks, and their respective network devices can be under administrative control of separate network controllers. For example, in other embodiments, an access fabric site can be a data center network whose network devices are under administrative control of a separate data center network controller (e.g., Cisco® Application Policy Infrastructure Controller (Cisco APIC™)) but the access fabric site 120 can share at least one fabric access border device with the data center network to interconnect them.

As used herein, an access fabric transit area can be a network address space (e.g., LISP Routing Locator (RLOC) network address space, Cisco® SD-WAN Transport Locator (TLOC) network address space, Virtual Tunnel Endpoint Identifier (VTEP) network address space, etc.) of each access fabric site 120 that may have its own access fabric control plane devices 110 and/or access fabric border devices 122 but does not have access fabric access layer devices 126. In addition, an access fabric transit area can share at least one access fabric border device 122 with each access fabric site 120 that the access fabric transit area interconnects. Thus, the network address space between the access fabric border device 122D and the access fabric control plane device 110C and between the access fabric border devices 122A-D and the access fabric control plane device 110C and WAN fabric edge devices 310A-E can be examples of access fabric transit areas. In general, an access fabric transit area can connect the access fabric sites 120 to the external world. There are several approaches to provide external connectivity, such as via a traditional IP network (e.g., the Internet transport network 302), a traditional WAN (e.g., the MPLS network 306), SD-WAN (e.g., the WAN fabric 304), or native connectivity (e.g., between the access fabric border device 122D and the access fabric control plane device 110C if the access fabric control plane device did not operate as the access fabric access device 126). Traffic across the access fabric sites 120, and other types of sites, can use the control plane and data plane network address spaces of the access fabric transit area to provide connectivity between sites. The access fabric border devices 122 can operate as handoff points from the access fabric sites 120 for delivery of traffic to other sites. The access fabric transit areas can include additional features. For example, if the access fabric transit area is a WAN, then features like performance routing may also be used. In some embodiments, to provide end-to-end policy and segmentation, the access fabric transit area may be capable of carrying endpoint context information (e.g., Virtual Local Area Networks (VLANs), Virtual Network Identifiers (VNIDs), Virtual Routing and Forwarding (VRF) instances, Virtual Private Networks (VPNs), Endpoint Groups (EPGs), Security Group Tags (SGTs), etc.). Otherwise, a re-classification of the traffic may be needed at the access fabric transit area.

In some embodiments, a local fabric access control plane device in each access fabric site may only hold state relevant to endpoints that are connected to access fabric access layer devices within a local access fabric site. The local fabric access control plane device can register local endpoints via local access fabric access layer devices, as with a single fabric site (e.g., the access fabric of FIG. 1). An endpoint that is not explicitly registered with the local fabric access control plane device may be assumed to be reachable via access fabric border devices connected to the access fabric transit areas. In some embodiments, local fabric access control plane devices may not hold state for endpoints attached to other access fabric sites such that access fabric border devices do not register information from the access fabric transit area. In these embodiments, a local fabric access control plane device can be independent of other access fabric sites to enable overall scalability of a network.

In some embodiments, an access fabric control plane device in an access fabric transit area can hold summary state for all access fabric sites that it interconnects. This information can be registered to an access fabric control plane device by access fabric border devices from different access fabric sites. Access fabric border devices can register local endpoints (e.g., LISP Endpoint Identifiers (EIDs)) from a local access fabric site into a local access fabric control plane device for summary EIDs only and thus further improve scalability.

The shared services 250 can also include one or more access fabric controller appliances 104, AAA appliances 106, and other shared network appliances (e.g., the DNS, DHCP, IPAM, and other shared network address management services 254; SNMP and other monitoring tools; NetFlow, syslog, and other data collectors, etc.). In other embodiments, the shared services 250 can reside outside of the access fabric 120 and in a global routing table (GRT) of an existing network. In these cases, some method of inter-VRF routing may be required.

The WAN fabric 304 includes a WAN fabric controller 308, WAN fabric edge devices 310F and 310G connected to provider edge devices 312A and 312B in the Internet transport network 302 and WAN fabric edge devices 310H and 310I connected to provider edge devices 312C and 312D. The WAN fabric controller 308 can establish secure connections to each WAN fabric edge device 310 and distribute route and policy information via a control plane protocol (e.g., Overlay Management Protocol (OMP), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the WAN fabric controller 308 can operate as a route reflector. The WAN fabric controller 308 can also orchestrate secure connectivity in between the WAN fabric edge devices 310. For example, in some embodiments, the WAN fabric controller 308 can distribute crypto key information among the WAN fabric edge devices 310. This can allow the WAN fabric 304 to support a secure network protocol or application (e.g., IP Security (IPSec), Transport Layer Security (TLS), Secure Shell (SSH), etc.) without Internet Key Exchange (IKE) and enable scalability of the WAN fabric. In some embodiments, physical or virtual Cisco® SD-WAN vSmart controllers can operate as the WAN fabric controller 308.

The WAN fabric edge devices 310 can operate within various sites associated with an organization, such as the fabric sites 120 and the shared services 250, and so forth, or in the cloud (e.g., Infrastructure as a Service (IaaS), Platform as a Service (PaaS), SaaS, and other cloud service provider networks). The WAN fabric edge devices 310 can provide secure connectivity among the sites or the cloud over one or more transport networks, such as the Internet transport network 302, the MPLS network 306, and so forth. The WAN fabric edge devices 310 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the WAN fabric edge devices 310.

Various embodiments of the present disclosure involve Selective Tracking of Acknowledgments (STACKing, e.g., stacking acknowledgment information in main memory or on-chip memory instead of interface buffers or off-chip memory) to improve buffer utilization and traffic shaping of network devices, and applying machine learning models to optimize when to perform STACKing. A network operator can utilize traffic shaping to manage congestion by creating queues, assigning traffic to those queues based on the classifications of the traffic, and scheduling the traffic in the queues for transmission. During periods with light traffic (e.g., when there is no congestion), traffic may be sent out of an outgoing interface of a network device as soon as it arrives. During periods of congestion at the outgoing interface, traffic may arrive faster than the interface can send it. If the network device implements traffic shaping, traffic accumulating at the interface can be queued at the interface's buffer until the interface is free to send it; the traffic can then be scheduled for transmission according to its assigned priority and the queuing mechanism configured for the interface. The network device can determine the order of transmission by controlling which traffic is placed in which queue and how queues are serviced with respect to each other.

The effectiveness of traffic shaping can depend on the hardware of a network device, such as its CPU or NPU (e.g., chip), memory (e.g., on-chip memory), interface buffers (e.g., off-chip memory), and so forth. For example, traffic shaping can deny lower priority traffic bandwidth in favor of higher priority traffic and may, in a worst case scenario, result in lower priority traffic never being sent (e.g., the network device can drop lower priority traffic when the device lacks sufficient buffer space to retain all unsent traffic) and an increase in network latency. In addition, traffic shaping can require storage of a large number of acknowledgments (e.g., TCP ACKs) and a large buffer space to accommodate the acknowledgments, which can be relatively scarce for network devices. Traffic shaping can also introduce extra overhead (e.g., to classify traffic, assign traffic to queues, schedule transmission of queued traffic, etc.), and cause network devices to take longer to process datagrams depending on the availability of their CPUs or NPUs and memory. Conventional traffic shaping often utilizes a static configuration that is incapable of adapting to changing network conditions. A network device may encounter diverse types of traffic, and can reach obsolescence much more quickly than expected or make it difficult to grow the network if the device is unable to support a wide range of network behaviors.

The effectiveness of traffic shaping can also depend on how a network operator configures the network. A significant majority of network traffic today runs over Transmission Control Protocol (TCP). TCP is a transport protocol that takes a stream of data from an application, and can transport it reliably end to end. TCP divides the stream into segments and hands them off to IP for transmission as packets through the network. TCP can handle detection and retransmission of lost segments and may not pass the stream's data to the application until it can be delivered in order. Packet loss can add latency while the segment is recovered. This means that loss and latency can be effectively equivalent from an application's perspective when using TCP.

Congestion control is a mechanism that TCP can use to determine when to transmit segments. To implement congestion control, TCP can probe the network by increasing the rate of transmission in order to determine the optimal rate as represented by the number of packets "in flight" at any given time. Once it finds this level, TCP can continually adjust based on signals from the network (e.g., packet loss, RTT, etc.).

Each end of a TCP session can maintain two independent windows that determine how many unacknowledged segments may be in transit at a time, a receive window (rwnd) and a congestion window (cwnd). The receive window can be advertised in the TCP header. The receive window may communicate the available buffer capacity on the TCP receiver, and can change when the buffer fills. The TCP sender may not have more unacknowledged segments in the network than the value of the receive window as doing so can cause an overflow of the receiver's buffer. The congestion window can represent the network capacity to support the flow. At any given time, the minimum of the two windows or the window size W (sometimes also referred to as the send window, transmit window, effective window, etc.) can govern the number of unacknowledged segments that may be in transit. Releasing new segments as previous segments are acknowledged can have the effect of clocking and pacing the network, and action may be taken when this clock times out and the network is assumed to be in a congested state.

TCP can use several different strategies for managing congestion, such as slow start, congestion avoidance, fast retransmit, and fast recovery. Slow start can start the congestion window at some small multiple of the Maximum Segment Size (MSS) and grow by 1 MSS with each ACK, and increase the size of the congestion window by allowing an additional packet to be "in flight" every time an ACK is received. Thus, each segment acknowledged allows two new segments to be sent. This can effectively double the congestion window every RTT and result in an exponential increase in the congestion window. Once the congestion window reaches a certain size, called the slow start threshold (ssthresh), the TCP session can transition from slow start to congestion avoidance. In congestion avoidance, the congestion window can increase linearly rather than exponentially (e.g., one MSS per RTT).

As part of the acknowledgment process, the TCP receiver can implicitly inform the sender when it receives segments out of order. This can occur when the TCP sender receives multiple ACKs for the same segment. The receiver may communicate that it has received a new segment but can only acknowledge the previous segment since there is a gap. This can trigger fast retransmit. For example, if the receiver has segments 0-550, receives segments 552 and 553, and loses segment 551, then the receiver can send a duplicate ACK for 550 for each later segment received in this scenario (i.e., 3 ACKs for 550). The 3 duplicate ACKs for the segment 550 can allow the sender to retransmit sooner than waiting for a timeout. In some implementations of TCP, the receiver can send a selective ACK acknowledging discontinuous blocks of segments received correctly along with the sequence number of the last contiguous byte received successfully (e.g., an ACK for 550, 552, and 553), and the TCP sender may retransmit only segment 551.

In some implementations of TCP, a lost segment may always reset transmission to slow start. Fast recovery can avoid returning the session to slow start if the loss is detected via duplicate ACKs. Instead, when fast retransmit is triggered, ssthresh and the congestion window can both be set to half the current congestion window and the session can remain in congestion avoidance mode. This effectively skips over slow start. While the missing segment is being resolved, the acknowledgment of further out-of-order segments can allow new segments to be transmitted while still maintaining the allowed number of segments in flight. The duplicate ACKs do not trigger an increase in the congestion window. If fast retransmit is not successful, a timeout can occur, and the session can revert to slow start. In some implementations of TCP, regular retransmission and a reset to slow start can occur if more than one segment is lost within an RTT. If the same segment is retransmitted multiple times, the timeout window can increase exponentially, and the session performance may be significantly impacted.

Another consideration for implementing traffic shaping is the type of congestion experienced within the network, such as whether congestion is self-limiting or external. A capacity bottleneck link can be a link with the smallest available capacity on the path between a TCP sender and receiver. A link may be congested when traffic load is greater than available link capacity, and the transmitting network device must buffer traffic. Self-limiting congestion can occur when a TCP flow starts in an otherwise uncongested path, and saturates the capacity bottleneck link. That is, self-limiting congestion can occur when the capacity bottleneck link limits the flow's transmission rate or throughput and the flow itself fills up the network device's buffer space. External congestion can occur when a TCP flow starts in a path with an already congested link. Available capacity on the bottleneck link is effectively zero because the link is already congested. A new flow may have little additional impact on buffering because external traffic was already congesting the link before the new flow started.

Thus, to optimize throughput (e.g., by reducing unnecessary TCP window size shrinking), it can be critical to determine a suitable window size W to achieve a transmission rate or throughput as close to network capacity as possible. Setting too large of a value for the window size W can cause severe losses at a bottleneck link if the window size W overshoots the actual network capacity, and setting the window size W too small can inflate latency. A congestion threshold T can also be an important setting for correctly identifying congestion. As used herein, the congestion threshold T can refer to the ratio between actual throughput of a flow and the capacity of the bottleneck link (e.g., between 0.6 and 0.9). The optimal value of the congestion threshold T may vary depending on the traffic class and congestion state to which the flow corresponds. Lower values of the congestion threshold T (e.g., less than 0.3) can result in less accuracy in identifying external congestion, and higher values of the congestion threshold T (e.g., greater than 0.95) can result in less accuracy in identifying self-limiting congestion.

Figure 4:
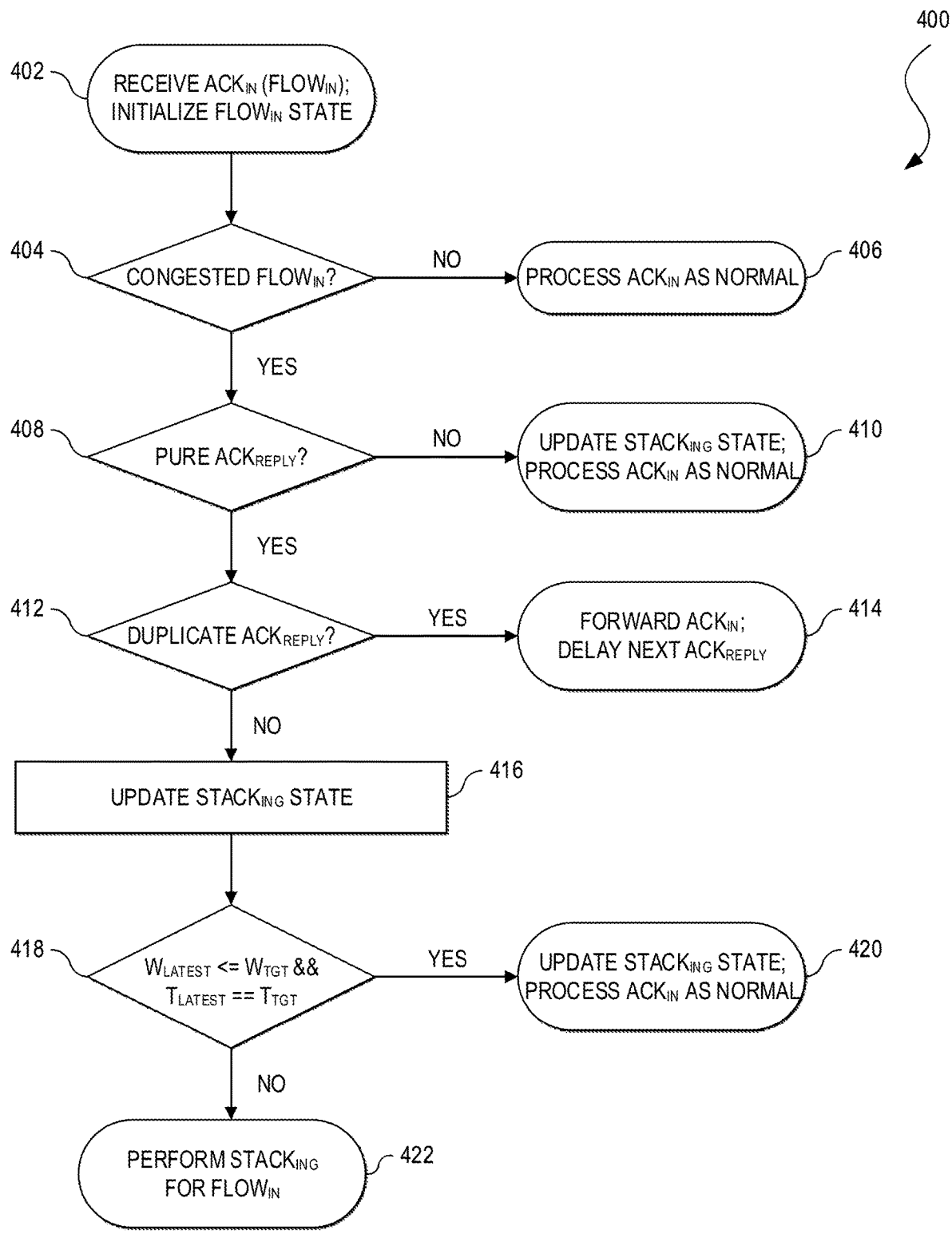
FIG. 4 illustrates an example of process that a network device can perform to selectively track acknowledgments to improve the device's buffer utilization and traffic shaping in accordance with an embodiment.

FIG. 4 illustrates an example of a process 400 for Selective Tracking of Acknowledgments (STACKing) to improve buffer utilization and traffic shaping of one or more network devices. The process 400 can be performed in whole or in part by one or more network devices (e.g., the wireless access point 128, the access fabric access device 126, the access fabric intermediate device 124, the access fabric border device 122, the access fabric control plane device 110, the WLC 108, the WAN fabric edge device 310, the provider edge device 312, etc.) or an upstream system for managing the one or more network devices (e.g., the access fabric controller appliance 104, the network management system 200, the WAN fabric controller 308, etc.). In this example, a STACKing agent running an access layer device (e.g., the access fabric access device 126 or the wireless access point 128) connected wired or wirelessly to a TCP sender (e.g., the endpoint 130) can perform the process 400. However, other embodiments may perform equivalent processes for other acknowledgment-based network protocols and/or other network devices or systems without departing from the scope of the present disclosure by applying the principles disclosed herein.

The STACKing agent can identify TCP flows (sometimes also referred to as TCP connections or sessions) that correspond to a predetermined traffic class and predetermined congestion state. The STACKing agent can track information of at least some TCP ACKs (e.g., pure TCP ACK$_{REPLY}$'s) of selected flows in the main memory (e.g., on-chip memory) of the agent's network device, filter the pure TCP ACK$_{REPLY}$'S of the selected flows from the interface buffers or off-chip memory of the agent's network device (e.g., exclude the pure TCP ACK$_{REPLY}$'s from the network device's interface buffers or off-chip memory), re-generate the filtered TCP ACK$_{REPLY}$'s from STACKing state information stored in main memory, and transmit the re-generated TCP ACK$_{REPLY}$'s according to traffic shaping policies specified for the predetermined traffic class and predetermined congestion state. In this manner, the STACKing agent can optimize traffic shaping by achieving quicker convergence to network behavior specified by an operator and providing smoother throughput (e.g., by reducing unnecessary TCP window size shrinking) for the network device. The STACKing agent can also significantly reduce the amount of buffer space the agent's network device may need for traffic shaping, and thereby provide network devices that are more adaptive to different types of traffic.

The process 400 can begin at step 402 in which the STACKing agent can receive an input TCP ACK (ACK$_{IN}$). If ACK$_{IN}$ is part of a new TCP connection or ACK$_{IN}$ is the first TCP ACK after a connection timeout, the STACKing agent can initialize or update TCP flow state information for a TCP flow corresponding to ACK$_{IN}$ (FLOW$_{IN}$). The flow state information for FLOW$_{IN}$ can include a flow-tuple (e.g., source IP address, source port number, destination IP address, destination port number, protocol, etc.), a cumulative number of bytes acknowledged ACK$_{BYTES}$ (discussed further below) by a TCP sender during a Round Trip Time (RTT) sampling period and various statistical information regarding RTTs of the RTT sampling period. The RTT sampling period can include the period between when FLOW$_{IN}$ is established and after a first retransmission or fast retransmission, the period between a latest Retransmission Timeout (RTO) and a retransmission, the last 5-10 RTTs, the last 5-10 minutes, and so on. The statistical RTT information can include the number N, the minimum (RTT$_{MIN}$), the maximum (RTT$_{MAX}$), the mean RTT ($\overline{RTT}$), the standard deviation ($\sigma$), the sum of squares of differences from mean (M$_{2,N}$), the sample variance (S$_N^2$), the population variance ($\sigma_N^2$), and the Coefficient of Variation (CV) of the sampled RTTs, among other statistical RTT information. In some embodiments, the STACKing agent can incrementally determine the statistical RTT information by calculating the latest statistical RTT values (N) from immediately preceding RTT statistical values (N−1) as follows:

$$\overline{RTT}_N = \overline{RTT}_{N-1} + \frac{RTT_N - \overline{RTT}_{N-1}}{N} \qquad \text{(Equation 1)}$$

$$M_{2,N} = M_{2,N-1} + (RTT_N - \overline{RTT}_{N-1})(RTT_N - \overline{RTT}_N) \qquad \text{(Equation 2)}$$

$$S_N^2 = \frac{M_{2,N}}{N-1} \qquad \text{(Equation 3)}$$

$$\sigma_N^2 = \frac{M_{2,N}}{N} \qquad \text{(Equation 4)}$$

$$CV_N = \frac{\sigma_N}{\overline{RTT}_N} \qquad \text{(Equation 5)}$$

Table 1 sets forth an example of TCP flow state information the STACKing agent can maintain for a TCP flow, including information identifying the flow (e.g., the flow-tuple), the cumulative number of bytes acknowledged ACK$_{BYTES}$ (discussed further below), and the number N, RTT$_{MIN}$, RTT$_{MAX}$, $\overline{RTT}$, and M$_{2,N}$ of the RTTs sampled during the RTT sampling period. In some embodiments, the STACKing agent can maintain the TCP flow information on a per traffic class basis. For example, the STACKing agent can map flows to traffic classes, such as by the mappings shown in Table 2. When the STACKing agent detects establishment of a new TCP connection, the STACKing agent can update the RTT statistical information (e.g., the RTT$_{MIN}$, RTT$_{MAX}$, M$_{2,N}$ S$_N^2$, $\sigma_N^2$, CV$_N$, etc.) from the RTT sampling period (e.g., using Equations 1-5). Long-lived flows can reference the latest statistical RTT information when necessary.

TABLE 1

TCP Flow State Information

| STATE PARAMETER | DESCRIPTION |
|---|---|
| Flow Tuple | Information for identifying a TCP flow (e.g., Source IP address, Source Port, Destination IP address, Destination Port, Protocol, etc.) |
| Cumulative ACK$_{BYTES}$ | Cumulative number of bytes transmitted by a TCP sender and acknowledged by a TCP receiver during an RTT sampling period for a TCP flow |
| N | Number of RTTs sampled during an RTT sampling period for a TCP flow |
| RTT$_{MIN}$ | Minimum of RTTs sampled during an RTT sampling period for a TCP flow |
| RTT$_{MAX}$ | Maximum of RTTs sampled during an RTT sampling period for a TCP flow |
| $\overline{RTT}_N$ | Mean of RTTs sampled during an RTT sampling period for a TCP flow |
| M$_{2,N}$ | Sum of square differences of Mean of RTTs sampled during an RTT sampling period for a TCP flow |

TABLE 2

Example Mapping of Flows to Traffic Classes

| FLOW PARAMETER(S) | TRAFFIC CLASS(ES) |
| --- | --- |
| Access Control list (ACL) number or | ACL-based classes |
| ATM Cell Loss Priority (CLP) value | ATM CLP-based classes |
| Class map name | User-defined traffic classes |
| Discard class value | Discard class-based traffic classes |
| Differential Services Code Point (DSCP) value | DSCP-based traffic classes |
| Fields defined in the Protocol Header Description Files (PHDFs) | PHDF-based traffic classes |
| Frame Relay Data-Link Connection Identifier (DLCI) number | Frame Relay DLCI-based traffic classes |
| Frame Relay Discard Eligibility (DE) bit setting | Frame Relay DE-based traffic classes |
| Input interface name | Input interface-based traffic classes |
| IP precedence values | IP precedence-based traffic classes |
| Layer 2 Class of Service (CoS) value | CoS-based traffic classes |
| Layer 3 packet length in the IP header | Packet length-based traffic classes |
| MAC address | MAC address-based traffic classes |
| Multiprotocol Label Switching (MPLS) Experimental (EXP) value | MPLS EXP-based traffic classes |
| MPLS EXP value in the topmost label | MPLS topmost EXP-based traffic classes |
| Port type | Port type-based traffic classes |
| Protocol type | Protocol type-based traffic classes |
| Protocol type == rtp | RTP traffic class |
| Protocol type == fasttrack | FastTrack peer-to-peer traffic class |
| Protocol type == http | Hypertext Transfer Protocol (HTTP) traffic class |
| Protocol type == nbar | Network-Based Application Recognition (NBAR) traffic classes (e.g., payload-based traffic classes, such as traffic classes based on Uniform Resource Locator (URL), host, Multipurpose Internet Mail Extensions (MIME) type; File Transfer Protocol (FTP), DNS, Post Office Protocol (POP3), etc.) |
| QoS group value | QoS group-based traffic classes |
| Real-Time Transport Protocol (RTP) port | RTP port-based traffic classes |
| Start of datagram | Layer-based traffic classes (e.g., Layer 2 traffic or Layer 3 traffic) |
| Tag type of class map | User-defined tag-based traffic classes |
| VNID or other virtual network segment identifier (e.g., VLAN, VRF, VPN, EPG, SGT, etc.) | Virtual network segment-based traffic classes |

At decision block 404, the STACKing agent can determine whether $ACK_{IN}$ is part of a congested flow. In some embodiments, the STACKing agent can receive one or more traffic class-specific congestion signatures from a network management system (e.g., the network management system 200) that the STACKing agent can apply to $ACK_{IN}$ or $FLOW_{IN}$ to evaluate whether $ACK_{IN}$ is part of a congested flow or $FLOW_{IN}$ is a congested flow. As discussed further below with respect to FIG. 5 and elsewhere in the present disclosure, the traffic class-specific congestion signatures can comprise one or more traffic class-specific classifiers or other machine learning models whose input can include traffic data (e.g., TCP segment, TCP flow, etc.) corresponding to a particular traffic class and whose output is an indication whether the traffic data corresponds to a predetermined congestion state. For example, given $FLOW_{IN}$, a traffic class-specific congestion signature can determine whether $FLOW_{IN}$ corresponds to flows of a particular traffic class when the flows of that traffic class are in a particular congestion state. If $ACK_{IN}$ and $FLOW_{IN}$ do not match any of the congestion signatures, then $ACK_{IN}$ is not part of a congested flow and $FLOW_{IN}$ is not a congested flow. Therefore, the STACKing agent does not select $FLOW_{IN}$ for STACKing, and the STACKing agent can conclude the process 400 and handle $ACK_{IN}$ as normal at step 406 (e.g., forward, drop, reject, queue, etc.). In some embodiments, if $FLOW_{IN}$ was previously STACKed, the STACKing agent can also ensure transmission of any outstanding TCP ACKs that have not yet been sent for $FLOW_{IN}$.

If $ACK_{IN}$ or $FLOW_{IN}$ match a congestion signature, then $ACK_{IN}$ is part of a congested flow and $FLOW_{IN}$ is a congested flow, and the process 400 can proceed to decision block 408 after the STACKing agent initializes or updates STACKing state information for $FLOW_{IN}$. For example, the STACKing state information can include information regarding the latest Request ACK ($ACK_{REQ}$) or the latest ACK that a TCP sender transmits to a receiver and the latest Reply ACK ($ACK_{REPLY}$) or the latest ACK that the TCP sender receives from the receiver in response to the latest $ACK_{REQ}$. If a Reply ACK does not have a payload, it may be referred to as a pure ACK because the segment only signals acknowledgment of TCP sender data and does not include TCP data.

Table 3 shows an example of a TCP flow between two endpoints (e.g., the endpoints 130), such as a web server and a client. Table 3 can include a numeric ordering of the TCP segments, contents of the TCP segments exchanged (with the length of the ACK denoted in parentheses), a direction of the TCP segments (e.g., the client on the left-hand side, and the web server on the right-hand side), a relative TCP sequence number $SEQ_{NO}$, a relative TCP acknowledgment number $ACK_{NO}$, and the cumulative number of bytes acknowledged, $ACK_{BYTES}$. $ACK_{BYTES}$ can refer to the difference between the $ACK_{NO}$ of the latest $ACK_{REPLY}$ received by the TCP sender and the $ACK_{NO}$ of the first $ACK_{REQ}$ transmitted by the TCP sender during an RTT sampling period:

Cumulative $ACK_{BYTES} = ACK_{REQ}.ACK_{NO} - ACK_{REQ}.ACK_{NO}$ (Equation 6)

TABLE 3

Example of a TCP Flow

| NO. | TCP SEGMENT | DIR | $SEQ_{No}$ | $ACK_{NO}$ | $ACK_{BYTEs}$ |
|---|---|---|---|---|---|
| 1 | SYN (0 bytes) | → | 0 | 0 | — |
| 2 | SYN, ACK (0 bytes) | ← | 0 | 1 | 1 |
| 3 | ACK (0 bytes) | → | 1 | 1 | 1 |
| 4 | PSH, $ACK_{REQ}$ (725 bytes) | → | 1 | 1 | 1 |
| 5 | $ACK_{REPLY}$ (0 bytes) | ← | 1 | 726 | 725 |
| 6 | $ACK_{REQ}$ (1448 bytes) | ← | 1 | 726 | 725 |
| 7 | $ACK_{REPLY}$ (0 bytes) | → | 726 | 1449 | 1448 |
| 8 | $ACK_{REQ}$ (1448 bytes) | ← | 1449 | 726 | 725 |
| 9 | $ACK_{REPLY}$ (0 bytes) | → | 726 | 2897 | 2896 |
| 10 | $ACK_{REQ}$ (1448 bytes) | ← | 2897 | 726 | 725 |
| 11 | $ACK_{REPLY}$ (0 bytes) | → | 726 | 4345 | 4344 |
| 12 | $ACK_{REQ}$ (1448 bytes) | ← | 4345 | 726 | 725 |
| 13 | $ACK_{REPLY}$ (0 bytes) | → | 726 | 5793 | 5792 |
| 14 | $ACK_{REQ}$ (1448 bytes) | ← | 5793 | 726 | 725 |
| 15 | $ACK_{REPLY}$ (0 bytes) | → | 726 | 7241 | 7240 |
| 16 | $ACK_{REQ}$ (1448 bytes) | ← | 7241 | 726 | 725 |
| 17 | $ACK_{REPLY}$ (0 bytes) | → | 726 | 8689 | 8688 |

In Table 3, the TCP flow can begin with a TCP handshake corresponding to segment numbers 1-3, and can further include an HTTP request, from the client (as the TCP sender) to the web server (as the TCP receiver), corresponding to TCP segment numbers 4-5, and an HTTP response, from the server (as the TCP sender) to the client (as the receiver), corresponding to TCP segments 6-17. If the RTT sampling period occurs over TCP segment numbers 1-17, the cumulative number of acknowledged bytes $ACK_{BYTES}$ for the web server (as the TCP sender) can be calculated by taking the difference of the $ACK_{NO}$ of the latest $ACK_{REPLY}$ received by the web server (e.g., TCP segment number 17 having the $ACK_{NO}$ of 8689) and the $ACK_{NO}$ of the first $ACK_{REQ}$ transmitted by the web server (e.g., TCP segment number 6 having the $ACK_{NO}$ of 1) (i.e., 8689-1=8688). The cumulative number of acknowledged bytes $ACK_{BYTES}$ for the client (as the TCP sender) can be calculated by taking the difference of the $ACK_{NO}$ of the latest $ACK_{REPLY}$ relived by the client (e.g., TCP segment number 5 having the $ACK_{NO}$ of 726) and the $ACK_{NO}$ of the first $ACK_{REQ}$ transmitted by the client (e.g., TCP segment number 4 having the $ACK_{NO}$ of 1) (i.e., 726-1=725). Although the number of acknowledged bytes $ACK_{BYTES}$ in these examples are cumulative, other embodiments may also use instant values of $ACK_{BYTES}$ when the RTT sampling period comprises a single RTT:

Instant $ACK_{BYTES} = ACK_{REPLY}.ACK_{NO} - ACK_{REPLY-1}.ACK_{NO}$ (Equation 7)

Instant $ACK_{BYTES} = ACK_{REPLY}.ACK_{NO} - ACK_{REQ}.SEQ_{NO}$ (Equation 8)

Instant $ACK_{BYTES} = ACK_{REQ}.LEN$ (Equation 9)

For example, the instant $ACK_{BYTES}$ for the RTT corresponding to TCP segment numbers 16-17 can be calculated by taking the difference of the $ACK_{NO}$ f the latest $ACK_{REPLY}$ received by the web server (e.g., the TCP segment number 17 having the $ACK_{NO}$ of 8689) and the $ACK_{NO}$ of the immediately preceding $ACK_{REPLY}$ received by the web server (e.g., the TCP segment number 15 having the $ACK_{NO}$ of 7241) (i.e., 8689-7241=1448), which is also equivalent to the difference between the latest $ACK_{REPLY}.ACK_{NO}$ and the $SEQ_{NO}$ of the latest $ACK_{REQ}$ transmitted by the TCP sender (i.e., 8689-7241=1448), as well as the length (LEN) of the latest $ACK_{REQ}$ transmitted by the TCP sender (i.e., the TCP segment number 16 having the LEN of 1448). In some embodiments, the network device may support piggybacking of TCP sender data in $ACK_{REPLY}$'s, and a TCP ACK can operate as both an $ACK_{REPLY}$ received by a TCP sender and an $ACK_{REQ}$ sent by a TCP sender. For example, the web server may combine the TCP ACKs corresponding to segment numbers 5-6, and the combined TCP ACK can function as both an $ACK_{REPLY}$ received by a TCP sender (i.e., the client) responsive to the $ACK_{REQ}$ corresponding to TCP segment number 4, and as an $ACK_{REQ}$ transmitted by a TCP sender (i.e., the web server) to which the $ACK_{REPLY}$ corresponding to TCP segment number 7 is responsive.

As shown by Table 3, pure $ACK_{REPLY}$'s (e.g., the $ACK_{REPLY}$'s corresponding to TCP segment numbers 5, 7, 9, 11, 13, 15, 17, etc.) carry only TCP acknowledgment signaling information and no TCP sender data but can quickly accumulate in a conventional network device's buffers. During a period of time the network is in a congested state, the conventional network device may buffer dozens, hundreds, or more pure $ACK_{REPLY}$'s. This can consume a significant amount of the conventional network device's buffer space as well as increase latency to schedule their transmissions. In addition, if the conventional network device runs out of buffer space, the conventional network device may drop traffic and reset TCP connections that further increase network latency. Thus, in various embodiments, the STACKing agent can track information regarding pure $ACK_{REPLY}$'S in main memory or on-chip memory of the agent's network device instead of buffering them in the device's interface buffers or off-chip memory (e.g., filter or exclude the pure $ACK_{REPLY}$'s from the device's interface buffers or off-chip memory). The STACKing agent can re-generate the pure $ACK_{REPLY}$'s from the information stored for them in main memory, and transmit the re-generated $ACK_{REPLY}$'s according to traffic shaping policies specified for the traffic classes and congestion states to which the pure $ACK_{REPLY}$'s correspond.

Table 4 shows an example of the STACKing state information the STACKing agent can maintain for each STACKed flow, such as the TCP sequence number ($SEQ_{NO}$) of the latest Request ACK sent by the TCP sender ($ACK_{REQ}$), the TCP acknowledgement number $ACK_{NO}$ of the latest $ACK_{REQ}$, the $SEQ_{NO}$ of the latest Reply ACK received by the TCP sender ($ACK_{REPLY}$), the $ACK_{NO}$ of the latest $ACK_{REPLY}$, the $SEQ_{NO}$ of the latest re-generated $ACK_{REPLY}$ transmitted by the STACKing agent to the TCP sender on behalf of the receiver ($ACK_{PROXIED}$), the $ACK_{NO}$ of the latest $ACK_{PROXIED}$, and a target transmission rate timer ($TIMER_{TGT}$) for ensuring the STACKing agent can transmit re-generated $ACK_{REPLY}$'s at a target transmission rate or throughput ($TR_{TGT}$) specified by a traffic shaping policy. In some embodiments, the STACKing state information for each STACKed flow can also include a current window size $W_{LATEST}$, a current congestion threshold $T_{LATEST}$, a target window size $W_{TGT}$, and a target congestion threshold $T_{TGT}$. In other embodiments, the STACKing agent can obtain the current window size $W_{LATEST}$, the current congestion threshold $T_{LATEST}$, the target window size $W_{TGT}$, and the target congestion threshold $T_{TGT}$ dynamically as discussed further below. In still other embodiments, the target window size $W_{TGT}$, and the target congestion threshold $T_{TGT}$ can be determined for a traffic class and congestion state to which a STACKed flow corresponds.

segment numbers 5-6 in Table 3. In these situations, the $ACK_{IN}$ may be referred to as a nominally pure TCP $ACK_{REPLY}$, and the process 400 can continue to decision block 412 for handling the $ACK_{REPLY}$ portion of $ACK_{IN}$, and return to step 410 for handling the TCP $ACK_{REQ}$ portion of $ACK_{IN}$.

If $ACK_{IN}$ does not include a payload, then it is a pure $ACK_{REPLY}$ (or a nominally pure $ACK_{REPLY}$ in some cases), and the process 400 can proceed to decision block 412 in which the STACKing agent can determine whether $ACK_{IN}$

TABLE 4

Example STACKing State Information

| STATE PARAMETER | DESCRIPTION |
|---|---|
| Latest $ACK_{REQ}.SEQ_{NO}$ | TCP sequence number of latest Request ACK transmitted by a TCP sender for a TCP flow |
| Latest $ACK_{REQ}.ACK_{NO}$ | TCP acknowledgment number of latest Request ACK transmitted by a TCP sender for a TCP flow |
| Latest $ACK_{REPLY}.SEQ_{NO}$ | TCP sequence number of latest Reply ACK received by a TCP sender for a TCP flow |
| Latest $ACK_{REPLY}.ACK_{NO}$ | TCP acknowledgment number of latest Reply ACK received by a TCP sender for a TCP flow |
| Latest $ACK_{PROXIED}.SEQ_{NO}$ | TCP sequence number of latest Reply ACK transmitted to a TCP sender on behalf of a TCP receiver for a TCP flow |
| Latest $ACK_{PROXIED}.ACK_{NO}$ | TCP acknowledgment number of latest Reply ACK transmitted to a TCP sender on behalf of a TCP receiver for a TCP flow |
| $TIMER_{TGT}$ | Timer for transmitting Reply ACKs to a TCP sender on behalf of a TCP receiver according to a Target Transmission Rate ($TR_{TGT}$) for a TCP flow |
| $ACK_{BYTES}$ | Cumulative or instant number of bytes transmitted by a TCP sender and acknowledged by a TCP receiver during an RTT sampling period for a TCP flow |
| $W_{LATEST}$ | Estimated window size of a TCP flow |
| $T_{LATEST}$ | Estimated congestion threshold of a TCP flow |
| $W_{TGT}$ | Target window size for traffic class corresponding to a TCP flow |
| $T_{TGT}$ | Target congestion threshold for traffic class corresponding to a TCP flow |

In some embodiments, an upstream system can manage multiple STACKing agents running within multiple network devices. The upstream system can maintain a global TCP flow table (e.g., Table 1) and/or global STACKing state table (e.g., Table 4) for storing STACKing state information for TCP flows of the multiple network devices managed by the upstream system. The upstream system can push some of this information to each STACKing agent and/or the STACKing agent can pull some of this information for STACKing purposes. Alternatively or in addition, the STACKing agent can push some of its local STACKing state information to the upstream system's global STACKing state table, or the upstream system can pull the STACKing agent's local STACKing state information to update the global STACKing state table.

At decision block 408, the STACKing agent can determine whether or not $ACK_{IN}$ is a pure $ACK_{REPLY}$. If $ACK_{IN}$ includes a payload, then $ACK_{IN}$ is not a pure $ACK_{REPLY}$, and the STACKing agent can conclude the process 400 by updating STACKing state information for $FLOW_{IN}$ and processing $ACK_{IN}$ as normal at step 410 (e.g., forward, drop, reject, queue, etc.). For example, the STACKing agent can update the STACKing state information for $FLOW_{IN}$ by setting the information for $FLOW_{IN}$'s latest TCP $ACK_{REQ}$ with the information of $ACK_{IN}$ (e.g., $SEQ_{NO}$, $ACK_{NO}$, etc.). In some cases, the network device can support piggybacking of TCP sender data in TCP $ACK_{REPLY}$'s, and the STACKing agent may process a TCP $ACK_{REPLY}$ having a payload as a separate TCP $ACK_{REPLY}$ and TCP $ACK_{REQ}$ similar to TCP is a duplicate of the latest $ACK_{REPLY}$ for $FLOW_{IN}$. That is, if ($ACK_{IN}.SEQ_{NO}$==Latest $ACK_{REPLY}.SEQ_{NO}$ && $ACK_{IN}.ACK_{NO}$==Latest $ACK_{REPLY}.ACK_{NO}$), then $ACK_{IN}$ is a duplicate $ACK_{REPLY}$ from the TCP receiver indicating that the TCP receiver did not receive the $ACK_{REQ}$ having the $SEQ_{NO}$ and $ACK_{NO}$ of $ACK_{IN}$. The STACKing agent can address this at step 414 by immediately forwarding $ACK_{IN}$ to the TCP sender so that the TCP sender can retransmit the TCP segment corresponding to $ACK_{IN}$ to the TCP receiver, and delaying transmission of the next TCP $ACK_{REPLY}$ for $FLOW_{IN}$ to ensure the average transmission rate for $FLOW_{IN}$ remains within its target transmission rate. The STACKing agent may also use the selective ACK option (if enabled) to request for specific segments.

As an example, returning to Table 3, if the STACKing agent sequentially receives the $ACK_{REQ}$ corresponding to TCP segment number 6 from the web server, the $ACK_{REPLY}$ corresponding to TCP segment number 7 from the client, the $ACK_{REQ}$ corresponding to TCP segment number 8 from the web server, a duplicate $ACK_{REPLY}$ corresponding to TCP segment number 7 from the client (i.e., TCP segment numbers 6, 7, 8, 7), then the STACKing agent may assume that the $ACK_{REQ}$ corresponding to TCP segment number 8 has been lost. The STACKing agent can immediately forward the duplicate $ACK_{REPLY}$ corresponding to TCP segment number 7 to the web server so that the web server may retransmit the $ACK_{REQ}$ corresponding to TCP segment number 8 to the client, and the STACKing agent can delay transmission of the next $ACK_{REPLY}$ for the flow (e.g., the $ACK_{REPLY}$ corresponding to TCP segment number 8) to ensure the average transmission rate for the flow remains within its target transmission rate.

As another example, if the STACKing agent sequentially receives the $ACK_{REQ}$ corresponding to TCP segment number 6 from the web server, the $ACK_{REPLY}$ Corresponding to TCP segment number 7 from the client, the $ACK_{REQ}$ corresponding to TCP segment number 10 from the web server, and a duplicate $ACK_{REPLY}$ corresponding to TCP segment number 7 from the client (i.e., 6, 7, 10, 7), then the STACKing agent may assume that the $ACK_{REQ}$ corresponding to TCP segment number 8 has been lost. The STACKing agent can immediately forward the duplicate $ACK_{REPLY}$ corresponding to TCP segment number 7 to the web server so that the web server may retransmit the $ACK_{REQ}$ corresponding to TCP segment number 8 to the client, and the STACKing agent can delay transmission of the next $ACK_{REPLY}$ for the flow (e.g., the $ACK_{REPLY}$ corresponding to TCP segment number 8) to ensure the average transmission rate for the flow remains within its target transmission rate.

If process 400 reaches step 416, then $ACK_{IN}$ represents a contiguously ordered TCP $ACK_{REPLY}$ for $FLOW_{IN}$. That is, the Instant $ACK_{BYTES}$==Latest $ACK_{REQ}$.LEN. At step 416, the STACKing agent can update the STACKing state information for $FLOW_{IN}$, such as setting the information of the latest $ACK_{REPLY}$ for $FLOW_{IN}$ to the information for $ACK_{IN}$ (e.g., $ACK_{IN}.SEQ_{NO}$, $ACK_{IN}.ACK_{NO}$, etc.). In some cases, the STACKing agent can also update the number of bytes acknowledged $ACK_{BYTES}$, the current window size $W_{LATEST}$, the current congestion threshold $T_{LATEST}$, the target window size $W_{TGT}$, the target congestion threshold $T_{TGT}$, and/or $RTT_{LATEST}$, where:

$$RTT_{LATEST} = \text{Latest } ACK_{REPLY}.\text{TIME} - \text{Latest } ACK_{REQ}.\text{TIME} \quad \text{(Equation 10)}$$

In some embodiments, the STACKing agent can receive one or more traffic class-specific window size and/or congestion threshold estimators from a network management system (e.g., the network management system 200) that the STACKing agent can apply to traffic data (e.g., TCP segment, TCP flow, etc.) to determine the current window size $W_{LATEST}$ and current congestion threshold $T_{LATEST}$ of $FLOW_{IN}$. As discussed further below with respect to FIG. 5 and elsewhere in the present disclosure, the traffic class-specific window size and congestion threshold estimators can comprise one or more regression models or other machine learning models whose input can be traffic data (e.g., TCP segment, TCP flow, etc.) and whose output is the current window size $W_{LATEST}$ and/or congestion threshold $T_{LATEST}$ of the traffic data when the traffic data corresponds to a particular traffic class and congestion state. For example, given $FLOW_{IN}$, one or more regression models can determine the current window size $W_{LATEST}$ and/or the current congestion threshold $T_{LATEST}$ of $FLOW_{IN}$.

In some embodiments, the STACKing agent can determine $W_{TGT}$ and/or $T_{TGT}$ based on traffic shaping policies specified for the traffic class and congestion state to which $FLOW_{IN}$ corresponds. In other embodiments, the STACKing agent can determine $W_{TGT}$ and $T_{TGT}$ based on current network conditions in addition or alternatively to the traffic shaping policies for the traffic class and congestion state to which $FLOW_{IN}$ corresponds. For example, $W_{TGT}$ can be derived from the Bandwidth-Delay Product (BDP), such as a product of the minimum of the specified maximum bandwidth for the traffic class and congestion state to which $FLOW_{IN}$ corresponds ($BW_{MAX}$) and the bandwidth of the capacity bottleneck link ($BL_{CAP}$), and an RTT of $FLOW_{IN}$ (e.g., $RTT_{MIN}$, $RTT_{MAX}$, $RTT$, $RTT_{LATEST}$, etc.):

$$W_{TGT}(\text{bytes}) = (\min(BW_{MAX}, BL_{CAP})(\text{bps})/8)(RTT(\text{seconds})) \quad \text{(Equation 11)}$$

Another approach can determine $W_{TG}T$ as a product of a target transmission rate or throughput specified for the traffic class and congestion state to which $FLOW_{IN}$ Corresponds ($TR_{TGT}$), and $RTT_{MAX}$ of $FLOW_{IN}$:

$$WS_{TGT}(\text{bytes})(TR_{TGT}(\text{bps})8)(RTT_{MAX}(\text{seconds})) \quad \text{(Equation 12)}$$

The target congestion threshold $T_{TGT}$ can be the ratio between the target transmission rate or throughput specified for the traffic class and congestion state to which $FLOW_{IN}$ corresponds ($TR_{TGT}$) and the minimum of $BW_{MAX}$ and $BL_{CAP}$:

$$T_{TGT}TR_{TGT}(\text{bps})/\min(BW_{MAX}, BL_{CAP})(\text{bps}) \quad \text{(Equation 13)}$$

Another approach can determine the target congestion threshold $T_{TGT}$ as the ratio between the maximum receiver window size ($rwnd_{MAX}$) and a product of the minimum of $BW_{MAX}$ and $BL_{CAP}$ and an RTT of $FLOW_{IN}$ (e.g., $RTT_{MIN}$, $RTT_{MAX}$, $RTT$, $RTT_{LATEST}$, etc.):

$$T_{TGT} = \frac{rwnd_{MAX}(\text{bytes}) \times 8}{\min(BW_{MAX}, BL_{CAP})(\text{bps}) \times RTT(\text{seconds})} \quad \text{(Equation 14)}$$

At decision block 418, the STACKing agent can determine whether to initiate, continue, or suspend STACKing for $FLOW_{IN}$ based on the current window size $W_{LATEST}$ and/or current congestion threshold $T_{LATEST}$. $W_{LATEST}$ and $T_{LATEST}$ can indicate whether $FLOW_{IN}$ has reached its target window size $W_{TGT}$ and target congestion threshold $T_{TGT}$. In some embodiments, the STACKing agent can use a simple heuristic to determine whether to initiate, continue, or suspend STACKing for $FLOW_{IN}$. For example, if ($W_{LATEST}<=W_{TGT}$ and $T_{LATEST}==T_{TGT}$), then $FLOW_{IN}$ has not yet exceeded its target window size $W_{TGT}$ and target congestion threshold $T_{TGT}$. Therefore, the STACKing agent does not perform STACKing for $FLOW_{IN}$ so that $FLOW_{IN}$ may hit its target window size $W_{TGT}$ and target congestion threshold $T_{TGT}$. Instead, the STACKing agent may conclude the process 400 by processing the TCP $ACK_{REPLY}$ as normal (e.g., forward, drop, reject, queue, etc.). In some embodiments, the STACKing agent may also update the STACKing state information for $FLOW_{IN}$ to indicate suspension of STACKing for $FLOW_{IN}$ until the next RTT sampling period for $FLOW_{IN}$ or the next RTT sampling period for the traffic class to which $FLOW_{IN}$ corresponds.

In other embodiments, the decision to initiate, continue, or suspend STACKing for $FLOW_{IN}$ can be determined by a STACKing decision model received from a network management system (e.g., the network management system 200) that the STACKing agent can apply to traffic data (e.g., TCP segment, TCP flow) to determine whether to initiate, continue, or suspend STACKing. As discussed further below with respect to FIG. 5 and elsewhere in the present disclosure, the STACKing decision model can comprise one or more decision tree classifiers or other machine learning models whose input can be traffic data (e.g., TCP segment, TCP flow, etc.) and whose output is a decision whether to initiate, continue, or suspend STACKing for the traffic data.

If ($W_{LATEST}>W_{TGT}||T_{LATEST}>T_{TGT}$), then $FLOW_{IN}$ has exceeded its target window size $W_{TGT}$ or target congestion threshold $T_{TGT}$, and the process 400 can conclude with the STACKing agent performing STACKing for $FLOW_{IN}$ at step 422, which can involve tracking STACKing state information of $FLOW_{IN}$ in main memory of the agent's network device (e.g., Table 4), filtering or excluding the TCP $ACK_{REPLY}$'s of $FLOW_{IN}$ from the interface buffers or off-chip memory of the network device, re-generating the filtered TCP $ACK_{REPLY}$'s from the STACKing state information stored in main memory, and transmitting re-generated TCP $ACK_{REPLY}$'s at a transmission rate or throughput specified by a traffic shaping policy for the traffic class and congestion state to which $FLOW_{IN}$ corresponds ($TR_{TGT}$). For example, the STACKing agent can determine a target transmission rate $TR_{TGT}$ for $FLOW_{IN}$ from the traffic shaping policy, set a timer $TIMER_{TGT}$ for transmitting $ACK_{REPLY}$'s at the target transmission rate $TR_{TGT}$, re-generate an $ACK_{REPLY}$ having a $SEQ_{NO}$ corresponding to the latest $ACK_{PROXIED}.SEQ_{NO}$ and an $ACK_{NO}$ corresponding to the latest $ACK_{PROXIED}.ACK_{NO}$, transmitting the re-generated $ACK_{REPLY}$, and incrementing $ACK_{PROXIED}.SEQ_{NO}$ and $ACK_{PROXIED}.ACK_{NO}$ based on the target transmission rate $TR_{TGT}$ but no more than the latest $ACK_{REPLY}.SEQ_{NO}$ and $ACK_{REPLY}.ACK_{NO}$:

$$ACK_{PROXIED}.SEQ_{NO} <= \text{Latest } ACK_{REPLY}.SEQ_{NO} \quad \text{(Equation 15)}$$

$$ACK_{PROXIED}.SEQ_{NO} <= \text{Latest } ACK_{REPLY}.ACK_{NO} \quad \text{(Equation 16)}$$

The STACKing agent can continue to perform STACKing for $FLOW_{IN}$ until $FLOW_{IN}$ is no longer a congested flow, the estimated window size $W_{LATEST}$ and/or estimated congestion threshold $T_{LATEST}$ no longer exceed the target window size $W_{TGT}$ and/or target congestion threshold, respectively, or the STACKing decision models no longer determine that $FLOW_{IN}$ is suitable for STACKing.

Figure 5:
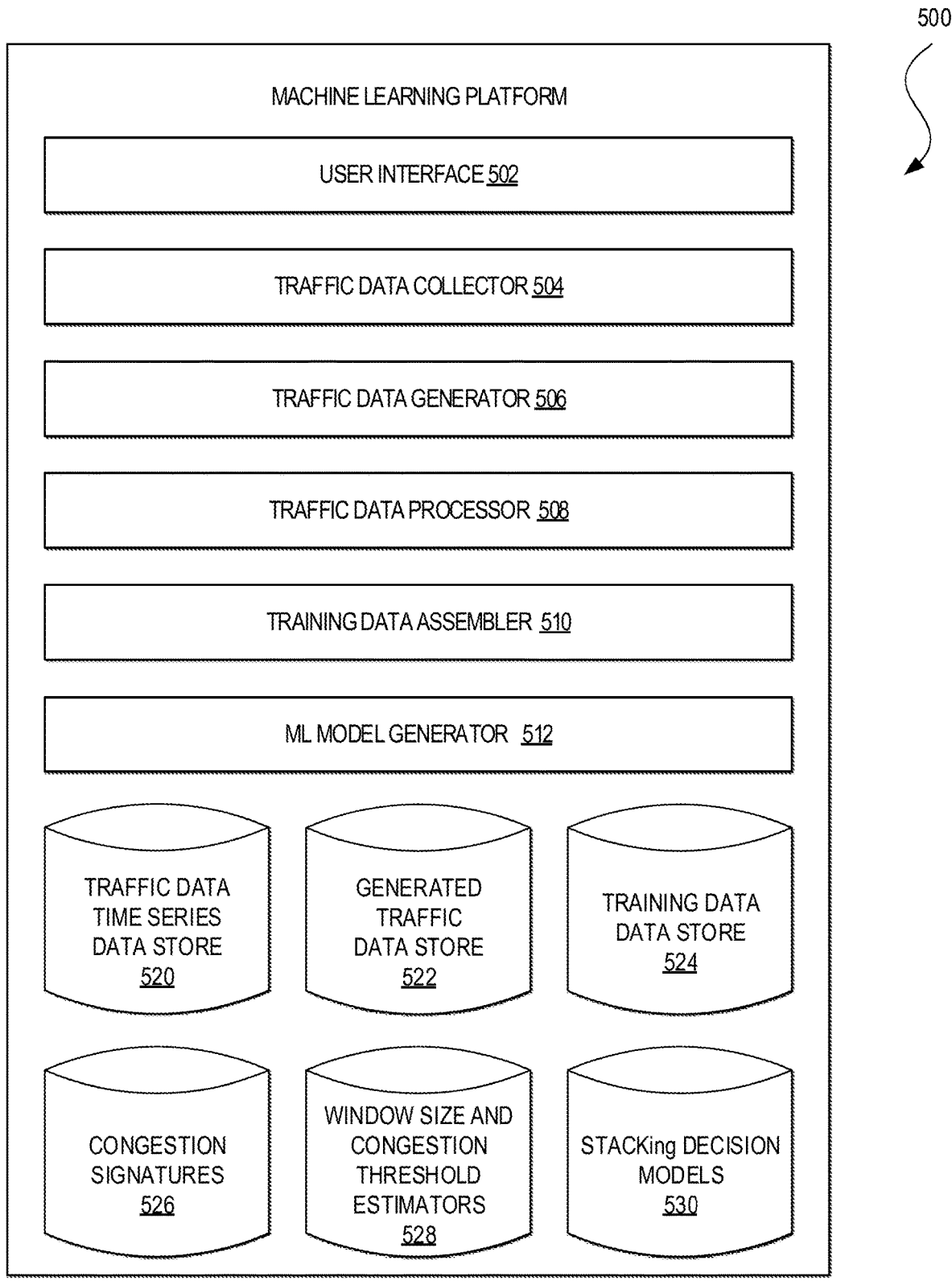
FIG. 5 illustrates an example of a machine learning platform in accordance with an embodiment.

FIG. 5 illustrates an example of a machine learning platform 500 for collecting and/or generating traffic data, processing the traffic data to generate data sets to provide as input to machine learners, assembling training data sets to provide as input to supervised machine learners, building machine learning models for analyzing a network (e.g., the access network 100) using the machine learners, and distributing the machine learning models to network nodes (e.g., the access fabric controller appliances 104, the WLCs 108, the access fabric control plane devices 110, the access fabric border devices 122, the access fabric intermediate devices 124, the access fabric access layer devices 126, the wireless access points 128, the endpoints 130, the shared services 250, the WAN fabric controller 308, the WAN fabric edge devices 310, etc.) to apply to new traffic data, among other operations. The machine learning platform 500 can be a part of the network management system 200 (e.g., the assurance functions 212, the network control platform 222, the network data platform 224, etc.) or a stand-alone platform. Using this approach, network nodes having relatively limited hardware resources can nonetheless take advantage of the substantial resources available to the network management system 200 for performing tasks that may otherwise be intractable for the network nodes individually. An example of an implementation of the machine learning platform 500 is the Cisco® Artificial Intelligence (AI) Center.

In some embodiments, the machine learning platform 500 can generate one or more traffic class-specific congestion signatures to identify whether input traffic data (e.g., TCP segment, TCP flow, etc.) corresponds to a predetermined traffic class and predetermined state (e.g., a congested state). For example, given a flow of a particular class (e.g., mapped based on the flow-to-traffic class mappings shown in Table 2), a traffic class-specific congestion signature can determine whether the given flow corresponds to a congested state for that traffic class.

As another example, the machine learning platform 500 can generate one or more window size and/or congestion threshold estimators for determining a TCP window size and/or congestion threshold for input traffic data when the input traffic data corresponds to a predetermined traffic class and predetermined congestion state. For example, given a flow corresponding to a particular traffic and congestion state, a window size and/or congestion threshold estimator can determine the current TCP window size and/or current congestion threshold for the given flow.

As yet another example, the machine learning platform 500 can generate one or more STACKing decision models for determining whether to perform STACKing for input traffic data. For example, given a flow, a STACKing decision model can determine that the given flow is suitable or unsuitable for STACKing. Other embodiments may include different numbers and/or types of machine learning models but one of ordinary skill the art will appreciate that such variations do not depart from the scope of the present disclosure.

In this example, the machine learning platform 500 includes a user interface 502, a traffic data collector 504, a traffic data generator 506, a traffic data processor 508, a training data assembler 510, and a machine learning model generator 512, and one or more data stores for storing the input data for the machine learning platform 500, such as a traffic data time series data store 520, the generated traffic data store 522, a data store for training data 524, and one or more data stores for storing the output data for the machine learning platform 500, such as a data store for traffic class-specific congestion signatures 526 to determine whether a given flow corresponds to a predetermined traffic class and predetermined congestion state, a data store for window size and congestion threshold estimators 528 to determine a current window size $W_{LATEST}$ and/or current congestion threshold $T_{LATEST}$ for a given flow of a predetermined traffic class and predetermined congestion state, and a data store for STACKing decision models 530 to determine whether a given flow is suitable for STACKing.

The traffic data collector 504 can capture network traffic data, such as packet traces, session logs, and performance metrics from different layers of the Open Systems Interconnection (OSI) model, the TCP/IP model, or other network model. The traffic data collector 504 can capture the traffic data at various levels of granularity, such as per datagram, unidirectional flow, or bidirectional flow (including TCP flows, connections, sessions, etc.), or other network data unit. For example, the traffic data collector 504 can capture traffic data of individual datagrams (e.g., datagram size, source address, source port, destination address, destination port, datagram type, protocol, TCP sequence number, TCP acknowledgment number, TCP flags, etc.); unidirectional flows (e.g., number of datagrams and aggregate size of datagrams having the same source address/port, destination address/port, protocol type, class of service, router/switch interface, etc., total number of unidirectional flows, unidirectional flows per second, etc.); bidirectional flows, connections, sessions (e.g., byte or datagram rate, bytes or datagrams received, bytes or datagrams sent, window size, flow control threshold, etc.); groups of flows (e.g., flow data for flows associated with a certain user or group, ACL, application, or other traffic class, etc.); and other network data units. Table 5 shows an example of the types of network data units and features of the network data units that the traffic data collector 504 can capture.

TABLE 5

Examples of Network Traffic Data Units and Features

| DATA UNIT | EXAMPLES OF FEATURES |
|---|---|
| Datagram | Protocol, length, Time To Live (TTL), source address, source port, destination address, destination port, TCP flags, content type (e.g., text, binary, encrypted, etc.), timestamp |
| Unidirectional Flow | Protocol, address, source port, destination address, destination port, flow duration, content type, flow volume in bytes and datagrams, datagram or flow statistics (minimum, mean, maximum, standard deviation, etc., of duration, volume, datagram inter-arrival times, etc.) |
| Bidirectional Flow; TCP Flow; TCP Connection; TCP Session | Application, protocol, source address, source port, destination address, destination port, duration, volume in bytes and datagrams, statistics (minimum, mean, maximum, standard deviation, etc., of RTTs, duration, volume, etc.) |

The traffic data generator 506 can generate simulated traffic that the training data assembler 510 can use to construct training data from which the machine learning model generator 512 can build machine learning models. The traffic data generator 506 can generate traffic at various levels of granularity, including frame-level, packet-level, flow-level, stream-level, application-level, and system-level. Frame-level and packet-level generators can create single frames or packets, respectively, having specified characteristics (e.g., protocol, source, destination, size, etc.). Flow-level generators can produce bursts of packets having specified traffic qualities (e.g., volume, packet inter-arrival times). Stream-level generators can be similar to flow-level generators but can simulate bi-directionality. Application-level generators can simulate application specific behaviors. System-level generators can simulate traffic for an entire network. Table 6 sets forth examples of implementations of network traffic generators of various levels of granularity.

TABLE 6

Examples of Traffic Generators

| Type | Name | Description |
|---|---|---|
| Frame-level generator | packETH | A tool for creating Ethernet frames and IP packets |
| Packet-level generator | ipgen | Raw socket programming tool for transmitting TCP, User Datagram Protocol (UDP), or ICMP packets |
| Packet-level generator | Packet Generator | A libnet based tool for creating custom packets |
| Packet-level | Pktgen-DPDK | Data Plane Development Kit (DPDK) based packet generator |
| Packet-level | MoonGen | DPDK based packet generator generator |
| Packet-level | pkt-gen | A netmap based packet generator |
| Packet-level | pfq-gen | A Packet Family Queue (PFQ) based packet generator |
| Packet-level | zsend | PF_RING ZC packet generator |
| Flow-level | Multi-Generator (MGEN) | Flow-level generator supporting different distributions of packet inter-arrival times and sizes |
| Flow-level | Realtime UDP Data Emitter (RUDE)/Collector for RUDE (CRUDE) | Kernel-level UDP flow generator |
| Flow-level | Iperf | User-level application for bandwidth, packet loss ratio, and jitter testing |
| Flow-level | netperf | User-level application for simulating bulk data transfers |
| Flow-level | Brawny and Robust Traffic analysis (BRUTE) | Kernel-level flow generator |
| Flow-level | BRUTE on Network Processor (BRUNO) | Hardware implemented flow generator |
| Flow-level | Kernel-based Traffic analysis (KUTE) | Kernel-level flow generator |
| Flow-level | Traffic Generator (TG) | Flow generator supporting different distributions of packet inter-arrival times and sizes |
| Flow-level | mxtraff | User-level application that can create TCP and UDP streams to emulate mice (e.g., small, intermittent TCP flows), elephants (e.g., large, continuous TCP flows), and dinosaurs (e.g., constant and continuous UDP flows) |
| Stream-level | Harpoon | Flow-based generator that can replicate NetFlow based measurements |

TABLE 6-continued

Examples of Traffic Generators

| Type | Name | Description |
| --- | --- | --- |
| Stream-level | Distributed Internet Traffic Generator (D-ITG) | Workload generator for various network scenarios |
| Stream-level | Netspec | Distributed system for generating traffic; offers synchronized set of flow-level generators for emulating stream-level behavior |
| Application-level | Tmix | Traffic emulator for n2 based on source-level TCP connections |
| Application-level | Ostinato | User-level flow generator |
| Application-level | TCPreplay | User-level application for replaying libpcap files |
| Application-level | TCPivo | Kernel-level replay engine |
| Application-level | ParaSynTG | Web traffic generator |
| Application-level | Scalable URL Reference Generator (SURGE) | HTTP workload generator |
| Application-level | YouTube ® Workload Generator | Workload generator for video traffic |
| Application-level | LiTGen | Statistically models IP traffic resulting from web requests on a user and application basis |
| System-level | Swing | Traffic generator that can replicate user, application, and network behavior corresponding to real traffic measurements |
| System-level | Scalable and flexible Workload generator for Distributed Data processing systems (SWORD) | Uses decision trees to simulate various types of communications, including voice |

The traffic data processor 508 can prepare the traffic data captured by the traffic data collector 504 and traffic data generator 506 for input into downstream components of the machine learning platform 500, such as the training data assembler 510 or the machine learning model generator 512. The traffic data processing tasks can include data cleansing, aggregation, filtration, data type conversion, normalization, discretization, other transformations, and feature extraction, among others. Data cleansing can involve tasks for handling missing values (e.g., ignoring data points having missing feature values, substituting missing values with dummy values, mean, mode, median, etc.), duplicate values or redundant or insignificant data (e.g., deleting or aggregating duplicate or redundant or insignificant data), and outliers or noise (e.g., binning, regression, deletion, etc.), among other irregularities.

Aggregation can involve constructing units of data at a specified level of granularity from traffic data, such as building packets into segments, segments into application layer protocol messages (e.g., unidirectional flows, requests, or responses), messages into connections (e.g., bidirectional flows or request/response pairs), connections into sessions, and so forth. Filtration can involve removing extraneous or duplicative data from traffic data. For example, in some embodiments, the traffic data processor 508 can eliminate small flows of short duration that never progress beyond slow start (e.g., less than 10 segments). Data type conversion can involve mapping raw data from one data type to another. For example, raw data may include numeric data and categorical data (e.g., the protocol of a packet can take values such as TCP, ICMP, Telnet, UDP, etc.). Some machine learning techniques may work with either numeric data or categorical data but not both. Thus, in some embodiments, the traffic data processor 508 can convert raw data to a form usable with a particular machine learning model (e.g., converting numeric data to categorical data or vice versa).

Normalization can involve equalizing or reweighting feature values to reflect their relative importance. For example, not all parameters or feature values may be of equal importance, or their value ranges may be highly variable. In some embodiments, the traffic data processor 508 can equalize, reweight, or otherwise adjust traffic data. Discretization can involve transforming continuous values into discrete values. For example, traffic data may have continuous valued attributes such as the number of packets, the number of bytes, and the duration of a session. In some embodiments, the traffic data processor 508 can convert continuous valued attributes into distinct binary values or ranges. Other types of transformations can include generalization (e.g., converting specific feature values to less specific feature values), rescaling (e.g., standardization, min-max scaling, etc.), non-linear transformations (e.g., mapping feature values to a uniform distribution, Gaussian distribution, etc.), compression/decompression, encryption/decryption, and so on.

Feature extraction can extract the discriminative characteristics of traffic data. A feature is generally a quality of a network data unit that can distinguish it from other network data units. Some examples of features for network traffic data include packet header or flow fields, such as a source address, source port, destination address, destination port, protocol type, or class of service, among others; content-based features (e.g., features within the payload, such as specific tokens or words in the payload); time-based features (e.g., round-trip time (RTT), Inter-Arrival Time (IAT) for request/response pairs, number of connections to the same host during a time interval, etc.); and connection- or session-based features (e.g., number of packets, number of bytes, number of flows, bandwidth utilization, latency, packet loss, jitter, etc.).

The training data assembler 510 can generate training data sets from a large collection of traffic data processed by the traffic data processor 508 and captured by the traffic data collector 504 over a period of time (e.g., days, weeks, months, etc.) or generated by the traffic data generator 506 to provide as input to machine learners. Machine learning is a field of computer science that uses statistical techniques to give computer systems the ability to learn or progressively improve performance on a specific task without being explicitly programmed. Machine learning can sometimes be categorized as supervised learning, unsupervised learning, semi-supervised learning, and reinforcement learning. Supervised machine learning can involve determining a model or a function that maps an input (e.g., a sample or a data point, such as a TCP datagram or TCP flow) to an output from exemplar input-output pairs typically referred to as a training data set. When the output is a discrete value (sometimes also referred to as a label, category, class, etc.), the learning task may be referred to as classification. When the output is a continuous value (e.g., a range of values), the learning task may be referred to as regression.

Supervised machine learning can comprise multiple phases, including a learning phase or a training phase in which a machine learning model (e.g., a classifier or a regression model) can be constructed from the training data points and their labels, and an evaluation phase in which the machine learning model can be utilized to determine a label for a new, unlabeled data point. In some embodiments, a STACKing agent can apply the traffic class-specific congestion signatures 526 to determine whether a given flow corresponding to a predetermined traffic class is in a predetermined congestion state. To generate a training data set for a traffic class-specific congestion signature 526, the traffic data collector 504 can collect or the traffic data generator 506 can create traffic data for a period of time, the traffic data processor 508 can process the traffic data, and the training data assembler 510 can label a portion of the processed traffic data that correspond to the predetermined traffic class and predetermined congestion state. In some cases, the training data assembler 510 can also label the remaining portion of the traffic data as not corresponding to the predetermined traffic class and predetermined congestion state depending on the machine learning algorithm. The training data assembler 510 can extract the minimum, maximum, and CV of RTTs sampled during RTT sampling periods for flows corresponding to the predetermined traffic class and predetermined congestion state (and, in some cases, flows not corresponding to the predetermined traffic class and predetermined congestion state) to generate the training data set for the traffic class-specific congestion signatures 526.

In some embodiments, a STACKing agent may apply the window size and congestion threshold estimators 528 to determine a current window size $W_{LATEST}$ and/or current congestion threshold $T_{LATEST}$ of a given flow corresponding to a predetermined traffic class and predetermined congestion state. To generate a training data set for a traffic class-specific window size and/or congestion threshold estimator 528, the training data assembler 510 can extract the minimum, maximum, and CV of RTTs sampled during RTT sampling periods for flows corresponding to the predetermined traffic class and predetermined congestion state. The training data assembler 510 can utilize the same set of traffic class-specific flows used to generate a corresponding traffic-class specific congestion signature 526, or the training data assembler may apply the corresponding traffic class-specific congestion 526 signature to second traffic data collected or generated over a second period of time to identify traffic class-specific flows corresponding to the predetermined congestion state.

The training data assembler 510 can determine the window size W and/or congestion threshold T for the traffic class-specific flows corresponding to the predetermined congestion state. For example, the training data assembler 510 can determine the window size W of a flow as the estimated size of the congestion window (cwnd) at the end of an RTT sampling period. The training data assembler 510 can determine the congestion threshold T as the ratio of actual throughput and the bandwidth of the capacity bottleneck link ($BL_{CAP}$), where the actual throughput can be estimated as the ratio of the receiver window size (rwnd) and an RTT (e.g., $RTT_{MIN}$, $RTT_{MAX}$, $\overline{RTT}$, $RTT_{LATEST}$, etc.).

$$W \approx cwnd \qquad \text{(Equation 17)}$$

$$T \cong \frac{\text{Actual Throughput}}{BL_{CAP}} \qquad \text{(Equation 18)}$$

$$\text{Actual Throughput} \cong \frac{rwnd}{RTT} \qquad \text{(Equation 19)}$$

The training data assembler 510 can also determine $ACK_{BYTES}$ for the traffic class-specific flows corresponding to the predetermined congestion state. $ACK_{BYTES}$ can be a cumulative value or an instant value depending on the size of the RTT sampling period.

In some embodiments, a STACKing agent may apply a STACKing decision model 530 to a given flow to determine whether to perform STACKing for the given flow. To generate a training data set for a STACKing decision model 530, the training data assembler 510 can extract the minimum, maximum, and CV of RTTs sampled during RTT sampling periods of flows corresponding to a predetermined congestion state. The training data assembler 510 can utilize the same set of flows used to generate the traffic class-specific congestion signatures 526 or the same set of flows used to generate the traffic class-specific window size and/or congestion threshold estimators 528. Alternatively, the training data assembler 510 may apply the traffic class-specific congestion signatures 526 or the window size and/or congestion threshold estimators 528 to third traffic data collected or generated over a third period of time to identify flows corresponding to the predetermined congestion state.

The training data assembler 510 can label flows corresponding to the predetermined congestion state that are suitable or unsuitable for STACKing to create the training data set for the STACKing decision model 530. For example, the training data assembler 510 can label a flow as suitable for STACKing based on its relative priority (e.g., a network device may buffer more datagrams of lower priority flows so such flows may be more suitable for STACKing), Quality of Service (QoS) level (e.g., a network device may be likelier to buffer non real-time flows and such flows may be more suitable for STACKing), volume (e.g., larger flows are likely to consume more of the network device's buffer space so such flows may be more suitable for STACKing), or other user-specified criteria.

The machine learning model generator 512 can build machine learning models for analyzing traffic data using supervised learning methods, such as Naïve Bayes classifiers, linear regression, logistic regression, polynomial regression, K Nearest Neighbors (K-NN), Support Vector Machines (SVMs), decision trees, random forests, boosting, and neural networks, among others. Naïve Bayes classifiers comprise a set of classifiers based on Bayes' theorem of conditional probability or the probability of a class 'c' given a set of feature values 'x':

$$P(c|x) = \frac{P(x|c)P(c)}{P(x)},\qquad \text{(Equation 20)}$$

where P(c|x) can represent the posterior probability of the class 'c' or the probability of the 'c' class given 'x' feature values, P(x|c) can represent the likelihood or the probability of 'x' feature values given the class 'c', P(c) can represent the prior probability of 'c' or the probability of class 'c' in the training data set, and P(x) can represent the prior probability of the 'x' feature values in the training data set. These classifiers may be characterized as naive because they assume that each feature is independent from one another for simplifying the calculation of P(xκ). The naive Bayes probability model can be combined with a decision rule for classification, such as a Maximum A Posteriori (MAP) rule, that classifies a data point based on a class having the greatest probability among the possible classes. Different types of naive Bayes classifiers may use different assumptions regarding the distribution of P(xκ), such as a Gaussian distribution, a multinomial distribution, or a Bernoulli distribution, among others.

Linear regression is used to explore the extent to which a variable or a set of variables (also called independent, predictor, or explanatory variables) may predict a dependent variable (also called the response, outcome, or target). Linear regression can also provide results in terms of the significance of the predictor variables as well as the magnitude (estimated coefficient value) and sign of relationship (e.g., negative or positive estimated coefficient sign). Linear regression techniques are used to create a linear model. The model can describe the relationship between a dependent variable (also called the response, outcome, or target) as a function of one or more independent variables (also called the predictor or explanatory variable). The linear regression model can describe the dependent variable with a straight line that is defined by the equation:

$$y=\beta_0+\beta_1 x+\varepsilon \qquad \text{(Equation 21)}$$

where y can represent the dependent variable, x can represent the independent variable, $\beta_0$ can represent the slope, $\beta_1$ can represent the y-intercept, and ε can represent the error term. Using observed values of x and y, the parameters $\beta_0$ and $\beta_1$ and ε of the regression line can be estimated from the values of the dependent variable y and the independent variable x with the aid of statistical methods. The regression line enables prediction of the value of the dependent variable y from that of the independent variable x. The slope $\beta_0$ of the regression line is called the regression coefficient. It can provide a measure of the contribution of the independent variable x toward explaining the dependent variable y. The method of least squares can be used to estimate $\beta_0$ and $\beta_1$. That is, $\beta_0$ and $\beta_1$ can be estimated so that the sum of the squares of the differences between the observations y and the straight line is a minimum.

The response y can be influenced by more than one predictor variable. A multiple or multivariable linear regression model can study the effect of multiple independent variables on the dependent variable. In the multiple linear regression model, the dependent variable is described as a linear function of the independent variables $x_i$:

$$y=\beta_0+\beta_1 x_1+\beta_2 x_2+\ldots+\beta_1 x_1+\varepsilon, \qquad \text{(Equation 22)}$$

The estimated coefficients $\beta_i$ can be interpreted as conditional on the other variables. That is, each $\beta_i$ can reflect the predicted change in y associated with a one-unit increase in $x_i$ that is conditional upon the rest of the other the independent variables $x_i$. This type of model can be used for more complex relationships between three or more variables.

A logistic regression model may rely on a logistic function (e.g., sigmoid function, s-curve, etc.) to represent the relationship between dependent and independent variables. In particular, logistic regression can model the log odds of p or the logit of p as a linear combination of the feature values $x_n$:

$$\text{logit}(p) = \log\left(\frac{p}{1-p}\right) = \beta_0 + \beta_1 x_1 + \ldots + \beta_n x_n, \qquad \text{(Equation 23)}$$

where p/(1−p) can represent the odds of the occurrence of an event, $\beta_0 \ldots \beta_n$ represent coefficients of the logit function, and $x_1 \ldots x_n$ can represent the feature values. Logistic regression can involve finding the values of the coefficients β that best fits the training data, such as by using Maximum Likelihood Estimation (MLE). Probability can then be derived from:

$$p = \frac{e^{logit}}{1+e^{logit}} = \frac{1}{1+e^{-logit}} \qquad \text{(Equation 24)}$$

Logistic regression models can be binomial (e.g., zero or one, class or not the class, etc.), multinomial (e.g., three or more unordered classes), or ordinal (e.g., three or more ordered classes).

A polynomial regression model can fit a nonlinear data space to represent the relationship between a dependent variable and independent variables. The polynomial regression model can take the form:

$$y=\beta_0+\beta_1 x_1+\beta_2 x_2^2+\beta_3 x_3^3+\ldots+\beta_n x_n^n+\varepsilon, \qquad \text{(Equation 25)}$$

A polynomial can have any number of terms (called the degree of the polynomial). For each degree of the polynomial, each independent variable $x_i$ can be multiplied by some parameter $\beta_i$, and $x_i$ can be raised to the power n. A straight line is considered a polynomial of degree 1, a quadratic polynomial is considered a polynomial of degree 2, a cubic polynomial is considered a polynomial of degree 3, and so on. A property of a polynomial regression model is that nearly any shape can be described by a polynomial of sufficient degree, within a limited range of values.

In a nearest neighbor classifier, the top K nearest neighbors to an unlabeled data point can be identified from the training data. The class label with the largest presence among the K nearest neighbors can be designated as the class label for the unlabeled data point. In some embodiments, training data points may be aggregated for improving classification. For example, small clusters can be determined from the instances of each class, and the centroid of each cluster may be used as a new instance. Such an approach may be more efficient and more robust to noise. Other variations may use different similarity (or distance) functions, such as the Minkowski distance or the Mahalanobis distance.

The Minkowski distance may be appropriate where feature vectors are independent and each feature vector is of equal importance. For example, if D is the distance between feature vectors v and w, and $f_i(x)$ is the number of features in a bin i of x, the Minkowski distance can be defined as:

$$D(v,w)=(\Sigma_i|f_i(v)-f_i(w)|^p)^{1/p}, \quad \text{(Equation 26)}$$

where p=1 is the $L_1$ distance (also sometimes called the Manhattan distance), p=2 is the $L_2$ distance (also known as the Euclidean distance), and p=∞ is the $L_\infty$ distance (also called the Chebyshev distance).

The Mahalanobis distance may be appropriate when each dimension of the feature vector is dependent of each other and is of different importance. The Mahalanobis distance can be defined as:

$$D(v,w)=\sqrt{(\mathcal{F}_V{}_v - \mathcal{F}_V{}_w)^T C^{-1}(\mathcal{F}_V{}_v - \mathcal{F}_V{}_w)}, \quad \text{(Equation 27)}$$

where C is the covariance matrix of the feature vectors v and w, $\mathcal{F}_V v$ and $\mathcal{F}_V w$ are vectors that list all the feature values in f(v) and $f_i$(w).

Other similarity (or distance) measures that can also be used include the cosine similarity, Jaccard coefficient, the Pearson correlation coefficient, and the averaged Kullback-Leibler divergence, among others. Some embodiments may also use various indexing structures or techniques for efficiently searching the feature set space, including multi-dimensional hashing, which can map features into fix-sized bins or buckets based on some function applied to each feature; locality sensitive hashing, which can use unions of independently computed hashing functions to index features; or multi-dimensional search trees, such as k-d trees, which can divide the multi-dimensional feature space along alternating axis-aligned hyper-planes to maximize search tree balance; among other approaches.

Support vector machines may be constructed by finding the linear conditions (referred to as a hyper-plane) that best separate classes from one other. Generating an SVM can involve plotting data points in n-dimensional space (where n is the number of features of the data points), identifying the hyper-planes that differentiate classes, and maximizing the distances (referred to as the margin) between the data points of the classes. In other words, an SVM classifier may identify the maximum margin hyper-plane from the training data set. The method of SVM classification can be extended to solve regression problems or Support Vector Regression (SVR).

A decision tree may be created from a data set in which each node of the tree can correspond to one or more features, and a branch or edge from the node to a child node can correspond to the possible values of the features. Each leaf can represent a class label whose feature values satisfy the specified ranges of the path from the root of the tree to the leaf. The partitioning at each level of the tree can be based on a split criterion, such as a condition or rule based on one or more features. Decision trees try to recursively split the training data so as to maximize the discrimination among different classes over different nodes of the tree. Decision tree algorithms may differ on how to select the splitting features and how to prune the tree when it becomes too large. Some examples of decision trees include Iterative Dichotomizer 3 (ID3), C4.5, Classification and Regression Tree (CART), and Chi-squared Automatic Interaction Detector (CHAID), among others.

Random forests may rely on a combination of decision trees in which each tree may depend on the values of a random vector sampled independently and with the same distribution for all trees in the forest. A random forest can be trained for some number of trees T by sampling N cases of the training data at random with replacement to create a subset of the training data. At each node, a number M of the features can be selected at random from the set of all features. The feature that provides the best split can be used to do a binary split on that node. At the next node, another number M of the features can be selected at random and the process can be repeated.

Boosting attempts to identify a highly accurate hypothesis (e.g., low error rate) from a combination of many weak hypotheses (e.g., substantial error rate). Given a data set comprising data points within a class and not within the class and weights based on the difficulty of classifying a data point and a weak set of classifiers, boosting can generate and call a new weak classifier in each of a series of rounds. For each call, the distribution of weights may be updated to reflect the importance of the data points in the data set for the classification. On each round, the weights of each incorrectly classified data point can be increased, and the weights of each correctly classified data point can be decreased so the new classifier can focus on the difficult data points (i.e., those data points that have not been correctly classified). Some examples of boosting methods include Adaptive Boosting (AdaBoost), Gradient Tree Boosting, and XGBoost, among others.

Neural networks are inspired by biological neural networks and can comprise an interconnected group of functions or classifiers that process information using a connectionist approach. The basic units of a neural network can be neurons (or perceptrons) that are connected to one another based on weights representing the strength of the connection between the units. A neural network can take input data from a set of dedicated input neurons and deliver its output to a set of dedicated output neurons. However, a neuron can generally operate as both an input unit and/or an output unit. For classification, a neural network can be characterized by the model of the neuron (e.g., binary threshold unit, linear threshold unit, linear unit, sigmoidal unit, distance unit, radial basis unit, polynomial unit, Gaussian unit, etc.), its net value function (e.g., the unit's parameters or weights to summarize input data), and its activation function (e.g., how the unit may transform the net value into an output value); the architecture or the topology connecting the neural network (e.g., single-layer network, multi-layer network, network with feedback, etc.); the data encoding policy defining how input data (e.g., feature vector) or class labels are represented in the neural network, and the training algorithm used to determine the optimal set of weights associated with each unit (e.g., Hebbian rule, delta rule, etc.). Examples of neural networks can include the multilayer neural network, the auto associative neural network, the probabilistic decision-based neural network (PDBNN), and the sparse network of winnows (SNOW), among others.

In some embodiments, the machine learning model generator 512 can construct the traffic class-specific congestion signatures 526 using classification techniques. As discussed above, a training data set for the traffic class-specific congestion signatures 526 can comprise a collection of flows labeled as corresponding to a predetermined traffic class and predetermined congestion state (and, in some cases, labeled as not corresponding to the predetermined traffic class and predetermined congestion state) along with the minimum, maximum, and CV of RTTs sampled during RTT sampling periods for the flows. The machine learning model generator 512 can provide the training data set as input to a classification algorithm (e.g., Naïve Bayes classifiers, logistic regression, K-NN, SVM, decision tree, random forest, boosting, neural network, etc.) to identify a function or a mapping based on the minimum, maximum, and CV of RTTs to the predetermined congestion state. The predetermined congestion state can be binary, such as congested or not congested, or a multi-class state corresponding to different levels of network congestion.

In some embodiments, the machine learning model generator 512 can construct the traffic class-specific window size and/or congestion threshold estimators 528 using polynomial regression. As discussed above, a training data set for the traffic class-specific window size and/or congestion threshold estimators 528 can comprise a collection of flows corresponding to the predetermined traffic class and predetermined congestion state along with the minimum, maximum, and CV of RTTs sampled during RTT sampling periods, the window size W and/or congestion threshold T, and $ACK_{BYTES}$ for the flows. For each traffic class, the machine learning model generator 512 can identify a polynomial function that best fits the training data set for that traffic class to create a window size and/or congestion threshold estimator 528. The polynomial function can comprise a single dependent variable (e.g., the window size W or the congestion threshold T) or multiple dependents variable (e.g., both the window size W and the congestion threshold T) and multiple independent variables based on the minimum, maximum, and CV of RTTs sampled during the RTT sampling periods and $ACK_{BYTES}$. For example, the independent variables can comprise the minimum, maximum, and CV of RTTs and $ACK_{BYTES}$ as separate variables, a combination of multiple independent variables (e.g., the difference of the maximum and minimum RTTs as a single independent variable), transformations of the independent variables (e.g., normalizing the difference of the maximum and minimum RTTs by dividing the difference by the maximum RTT), and so on.

In some embodiments, the machine learning model generator 512 can construct the STACKing decision models 530 using decision tree classification. In some embodiments, the STACKing decision models 530 can be traffic-class specific. In other embodiments, the STACKing decision models 530 can be applied to any flow in a congested state. As discussed above, a training data set for the STACKing decision models 530 can comprise a collection of flows corresponding to a predetermined congestion state (and a predetermined traffic class in some cases) along with the minimum, maximum, and CV of RTTs sampled during RTT sampling periods for the flows and a label indicating whether an individual flow is suitable for STACKing. The machine learning model generator 512 can build a decision tree using features based on the minimum, maximum, and CV of RTTs and the labels indicating suitability for STACKing.

FIG. 6 illustrates an example of a network device 600 (e.g., switch, router, network appliance, etc.). The network device 600 can include a master central processing unit (CPU) 602, interfaces 604, and a bus 606 (e.g., a Peripheral Component Interconnect (PCI) bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the Microprocessor without Interlocked Pipelined Stages (MIPS) family of microprocessors. In an alternative embodiment, the processor 608 can be specially designed hardware for controlling the operations of the network device 600. In an embodiment, a memory 610 (such as non-volatile Random Access Memory (RAM) and/or Read-Only Memory (ROM)) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
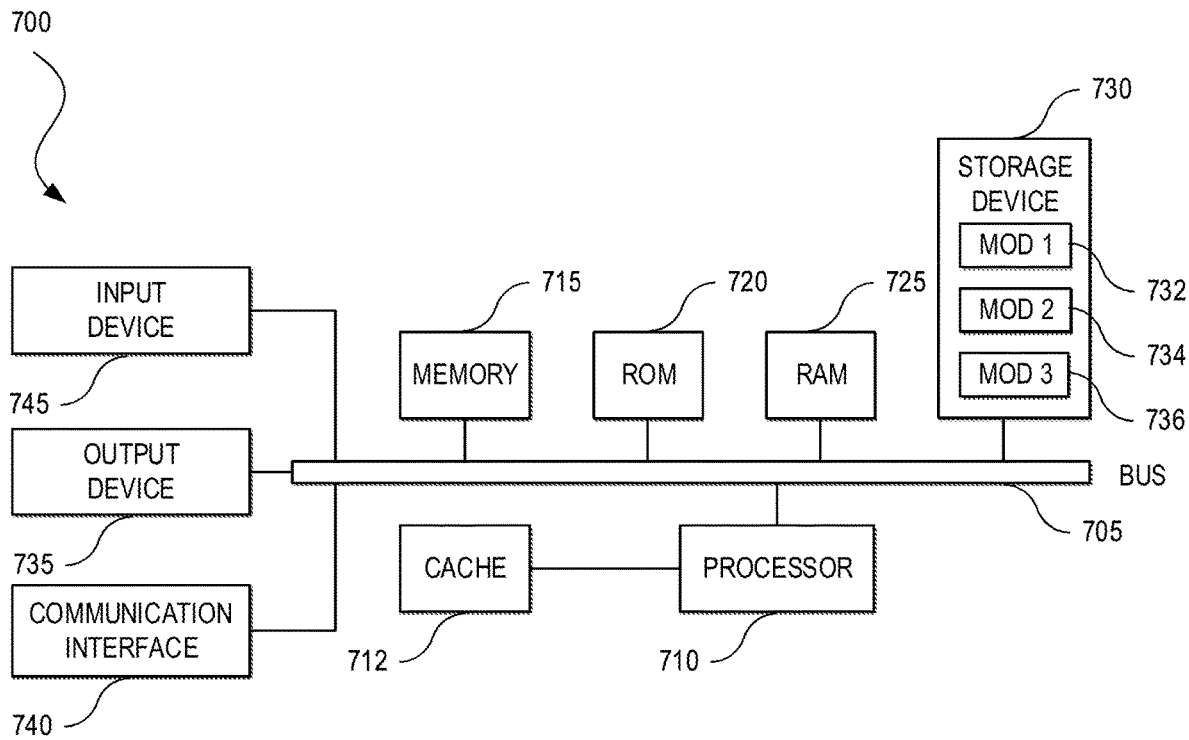
FIGS. 7A and 7B illustrate block diagrams of examples of computing systems in accordance with some embodiments.
Figure 7B:
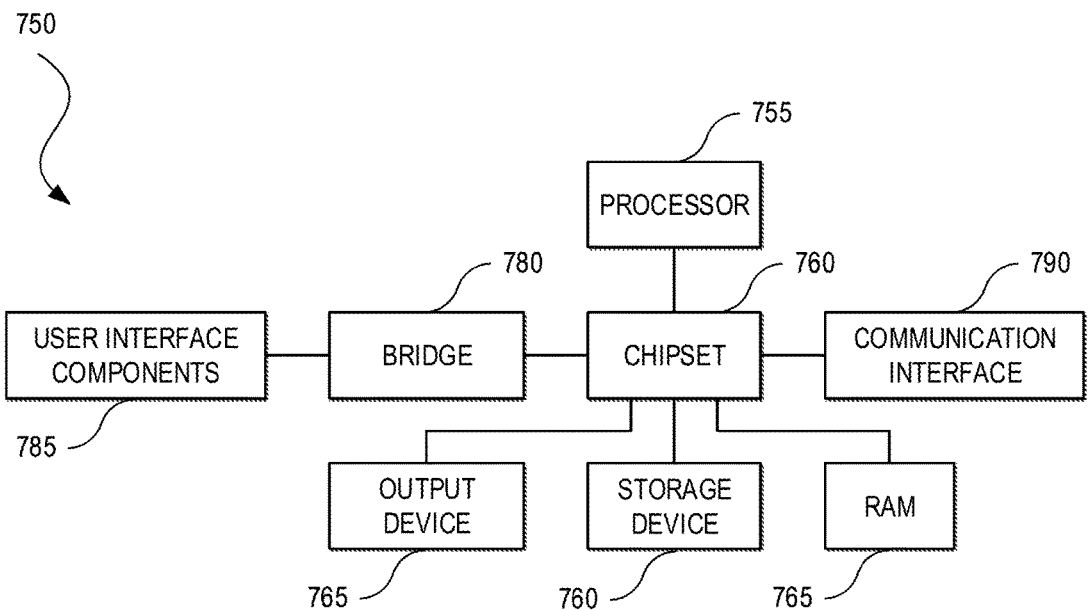

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   identifying, by a network device, within current traffic data of a network, a first flow that corresponds to a predetermined traffic class and a predetermined congestion state;
   determining at least one of a current window size or a current congestion threshold of the first flow; and
   in response to determining to selectively track a portion of acknowledgments of the first flow based on at least one of the current window size or the current congestion threshold,
   tracking, in main memory of the network device, information of a first portion of acknowledgments of the first flow;
   excluding, from one or more buffers of the network device, a second portion of acknowledgments of the first flow;
   re-generating segments corresponding to the second portion of acknowledgments based on the information in the main memory of the network device; and
   transmitting re-generated segments corresponding to the second portion of acknowledgements at a target transmission rate based on one or more traffic shaping policies for the predetermined traffic class and the predetermined congestion state.

2. The computer-implemented method of claim 1, further comprising:
   determining a plurality of Round Trip Times (RTTs) during a sampling period for the first flow;
   determining a minimum, a maximum, and a coefficient of variation of the plurality of RTTs; and
   inputting a plurality of inputs corresponding to the minimum, the maximum, and the coefficient of variation of the plurality of RTTs into one or more traffic class-specific congestion signatures corresponding to the predetermined traffic class and the predetermined congestion state to identify the first flow.

3. The computer-implemented method of claim 2, further comprising:
   mapping the first flow to the predetermined traffic class;
   receiving the one or more traffic class-specific congestion signatures corresponding to the predetermined traffic class; and
   determining, based on the one or more traffic class-specific congestion signatures, that the first flow corresponds to the predetermined congestion state.

4. The computer-implemented method of claim 1, further comprising:
   determining the second portion of acknowledgments of the first flow exclude Transmission Control Protocol (TCP) payloads.

5. The computer-implemented method of claim 1, further comprising:
   determining an acknowledgement of the first flow is a duplicate acknowledgment;
   forwarding the acknowledgment; and
   delaying transmission of a next acknowledgment of the first flow by a period of time such that an average transmission rate of the first flow corresponds to the target transmission rate.

6. The computer-implemented method of claim 1, further comprising:
   determining a plurality of RTTs during a sampling period for the first flow;
   determining a minimum, a maximum, and a coefficient of variation of the plurality of RTTs;
   determining a number of acknowledgment bytes transmitted by a TCP sender and acknowledged by a TCP receiver; and
   inputting a plurality of inputs corresponding to the minimum, the maximum, the coefficient of variation of the plurality of RTTs, and the number of acknowledgment bytes into one or more window size or congestion threshold estimators corresponding to the predetermined traffic class and the predetermined congestion state to identify determine at least one of the current window size or the current congestion threshold.

7. The computer-implemented method of claim 6, further comprising:
   determining at least one of a target window size or a target congestion threshold; and
   determining to selectively track the first portion of acknowledgments based on a comparison of at least one of the current window size to the target window size or the current congestion threshold to the target congestion threshold.

8. The computer-implemented method of claim 1, further comprising:
   inputting the current window size and the current congestion threshold into one or more decision models for determining whether to selectively track the portion of acknowledgments of the first flow.

9. The computer-implemented method of claim 1, further comprising:
   determining the target transmission rate; and
   setting a timer for transmitting the second portion of acknowledgments at the target transmission rate; and
   incrementing a TCP segment number and a TCP acknowledgment number corresponding to a latest TCP reply acknowledgment transmitted to a TCP sender on behalf of a TCP receiver.

10. The computer-implemented method of claim 1, further comprising:
    identifying, within the current traffic data, a second flow that corresponds to a second predetermined traffic class and a second predetermined congestion state;
    determining the second flow does not correspond to the second predetermined congestion state; and
    storing TCP reply acknowledgments of the second flow to the one or more buffers of the network device.

11. The computer-implemented method of claim 1, further comprising:
    identifying, within the current traffic data, a second flow that corresponds to a second predetermined traffic class and a second predetermined congestion state;
    determining a TCP request acknowledgment of the second flow includes a TCP payload; and
    updating, in main memory of the network device, information of a first portion of acknowledgments of the second flow.

12. The computer-implemented method of claim 1, further comprising:

identifying, within the current traffic data, a second flow that corresponds to a second predetermined traffic class and a second predetermined congestion state;

determining at least one of the current window size does not exceed a target window size or the current congestion threshold does not exceed a target congestion threshold; and updating, in main memory of the network device, information indicating to suspend selective tracking of the second flow.

13. A system, comprising:

one or more processors;

one or more buffers; and main memory including instructions that, when executed by the one or more processors, cause the system to:

identify, within current traffic data of a network, a first flow that corresponds to a predetermined traffic class and a predetermined congestion state;

determine at least one of a current window size or a current congestion threshold of the first flow; and in response to a determination to selectively track a portion of acknowledgments of the first flow based on at least one of the current window size or the current congestion threshold, track, in the main memory, information of a first portion of acknowledgments of the first flow;

exclude, from the one or more buffers, a second portion of acknowledgments of the first flow;

re-generate segments corresponding to the second portion of acknowledgments based on the information in the main memory; and transmit re-generated segments corresponding to the second portion of acknowledgements at a target transmission rate based on one or more traffic shaping policies for the predetermined traffic class and the predetermined congestion state.

14. The system of claim 13, further comprising further instructions that, when executed by the one or more processors, further cause the system to:

determine a plurality of Round Trip Times (RTTs) during a sampling period for the first flow;

determine a minimum, a maximum, and a coefficient of variation of the plurality of RTTs; and input a plurality of inputs corresponding to the minimum, the maximum, and the coefficient of variation of the plurality of RTTs into one or more traffic class-specific congestion signatures corresponding to the predetermined traffic class and the predetermined congestion state to identify the first flow.

15. The system of claim 14, further comprising further instructions that, when executed by the one or more processors, further cause the system to:

map the first flow to the predetermined traffic class;

receive the one or more traffic class-specific congestion signatures corresponding to the predetermined traffic class; and determine, based on the one or more traffic class-specific congestion signatures, that the first flow corresponds to the predetermined congestion state.

16. The system of claim 13, further comprising further instructions that, when executed by the one or more processors, further cause the system to:

determine an acknowledgement of the first flow is a duplicate acknowledgment;

forward the acknowledgment; and delay transmission of a next acknowledgment of the first flow by a period of time such that an average transmission rate of the first flow corresponds to the target transmission rate.

17. A non-transitory computer-readable storage medium including instructions that, upon being executed by one or more processors of a system, cause the system to:

identify, within current traffic data of a network, a first flow that corresponds to a predetermined traffic class and a predetermined congestion state;

determine at least one of a current window size or a current congestion threshold of the first flow; and in response to a determination to selectively track a portion of acknowledgments of the first flow based on at least one of the current window size or the current congestion threshold, track, in main memory of the system, information of a first portion of acknowledgments of the first flow;

exclude, from one or more buffers of the system, a second portion of acknowledgments of the first flow;

re-generate segments corresponding to the second portion of acknowledgments based on the information in the main memory of the system; and transmit re-generated segments corresponding to the second portion of acknowledgements at a target transmission rate based on one or more traffic shaping policies for the predetermined traffic class and the predetermined congestion state.

18. The non-transitory computer-readable storage medium of claim 17, further comprising further instructions that, when executed by the one or more processors, further cause the system to:

determine a plurality of Round Trip Times (RTTs) during a sampling period for the first flow;

determine a minimum, a maximum, and a coefficient of variation of the plurality of RTTs; and input a plurality of inputs corresponding to the minimum, the maximum, and the coefficient of variation of the plurality of RTTs into one or more traffic class-specific congestion signatures corresponding to the predetermined traffic class and the predetermined congestion state to identify the first flow.

19. The non-transitory computer-readable storage medium of claim 17, further comprising further instructions that, when executed by the one or more processors, further cause the system to:

determine the target transmission rate; and set a timer for transmitting the second portion of acknowledgments at the target transmission rate; and increment a TCP segment number and a TCP acknowledgment number corresponding to a latest TCP reply acknowledgment transmitted to a TCP sender on behalf of a TCP receiver.

20. The non-transitory computer-readable storage medium of claim 17, further comprising further instructions that, when executed by the one or more processors, further cause the system to:

identify, within the current traffic data, a second flow that corresponds to a second predetermined traffic class and a second predetermined congestion state;

determine the second flow does not correspond to the second predetermined congestion state; and store TCP reply acknowledgments of the second flow to the one or more buffers of the network device.

* * * * *